Aug. 12, 1930.  H. F. SMITH  1,772,643
GAS PRODUCER
Filed April 27, 1922   13 Sheets-Sheet 1

Witnesses  Inventor

Aug. 12, 1930.  H. F. SMITH  1,772,643
GAS PRODUCER
Filed April 27, 1922  13 Sheets-Sheet 3

Aug. 12, 1930.   H. F. SMITH   1,772,643
GAS PRODUCER
Filed April 27, 1922   13 Sheets-Sheet 4

Aug. 12, 1930.   H. F. SMITH   1,772,643
GAS PRODUCER
Filed April 27, 1922    13 Sheets-Sheet 5
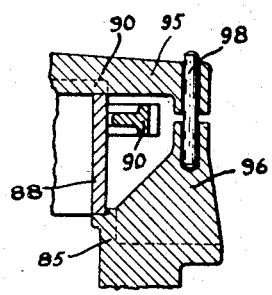
Fig.5a.
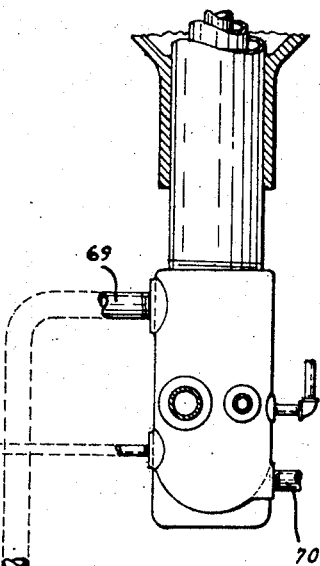
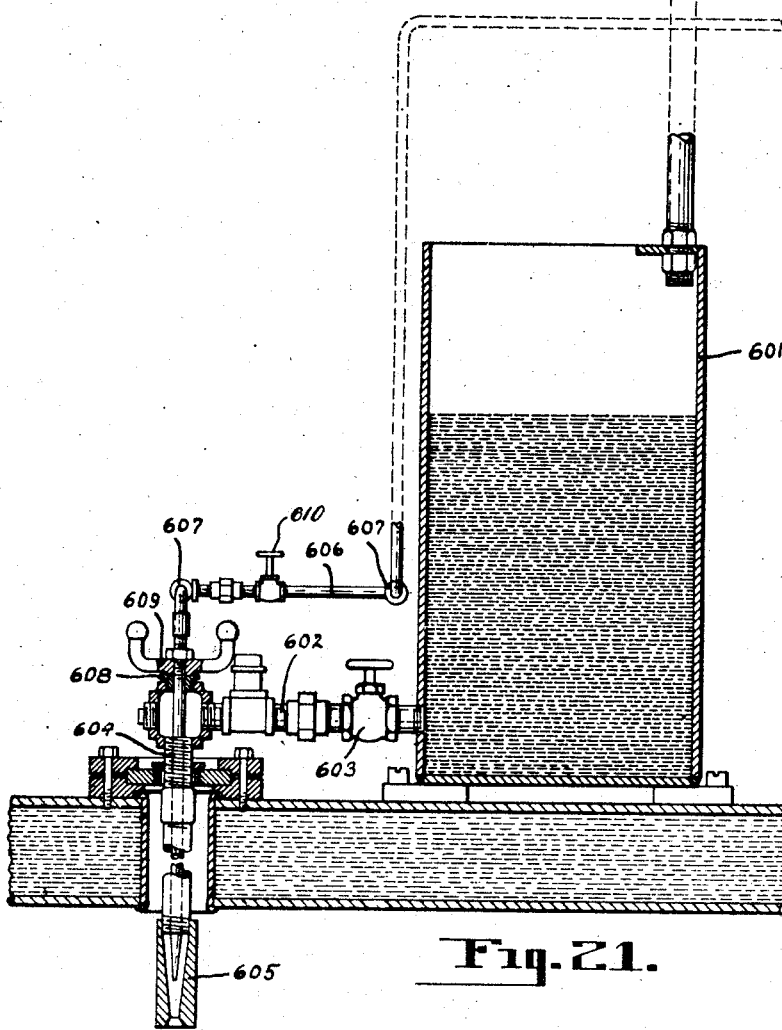
Fig.21.
Witnesses
Charles E. Greene
Edmund C. Sybil
Inventor
Harry F. Smith
By
Attorney Aug. 12, 1930.　　　　H. F. SMITH　　　　1,772,643
GAS PRODUCER
Filed April 27, 1922　　　13 Sheets-Sheet 6
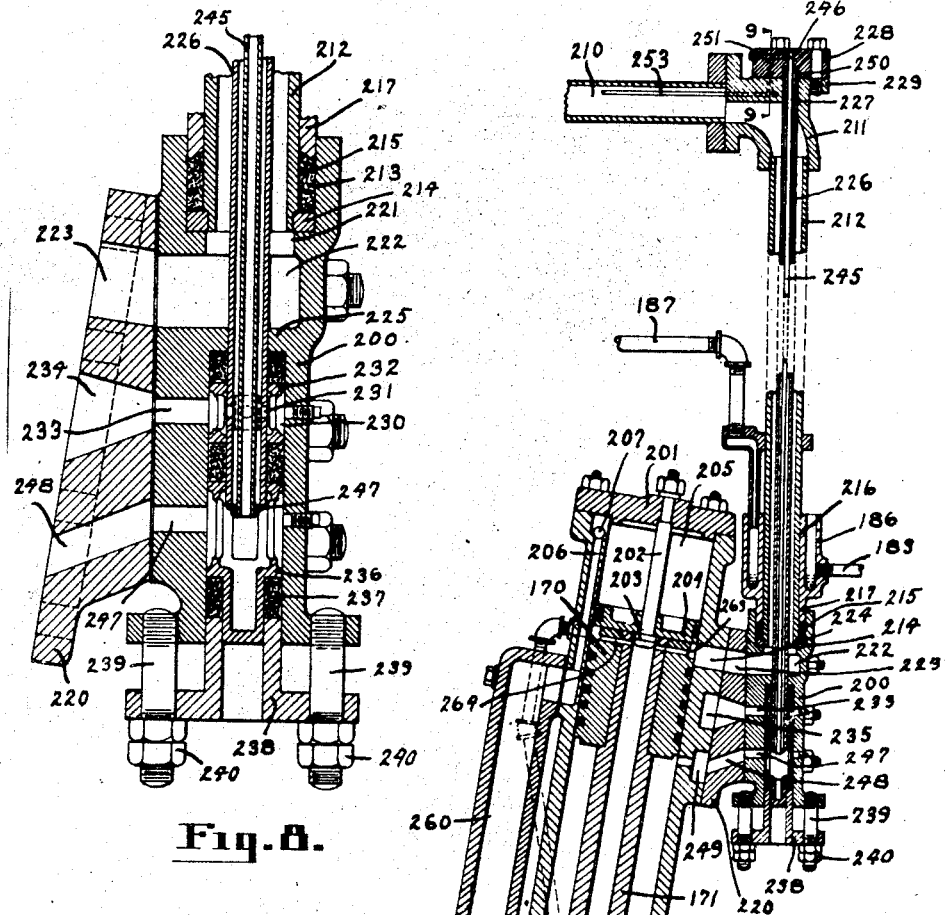
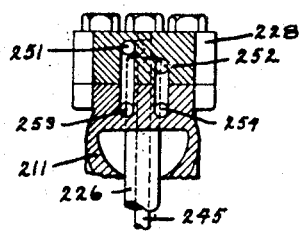

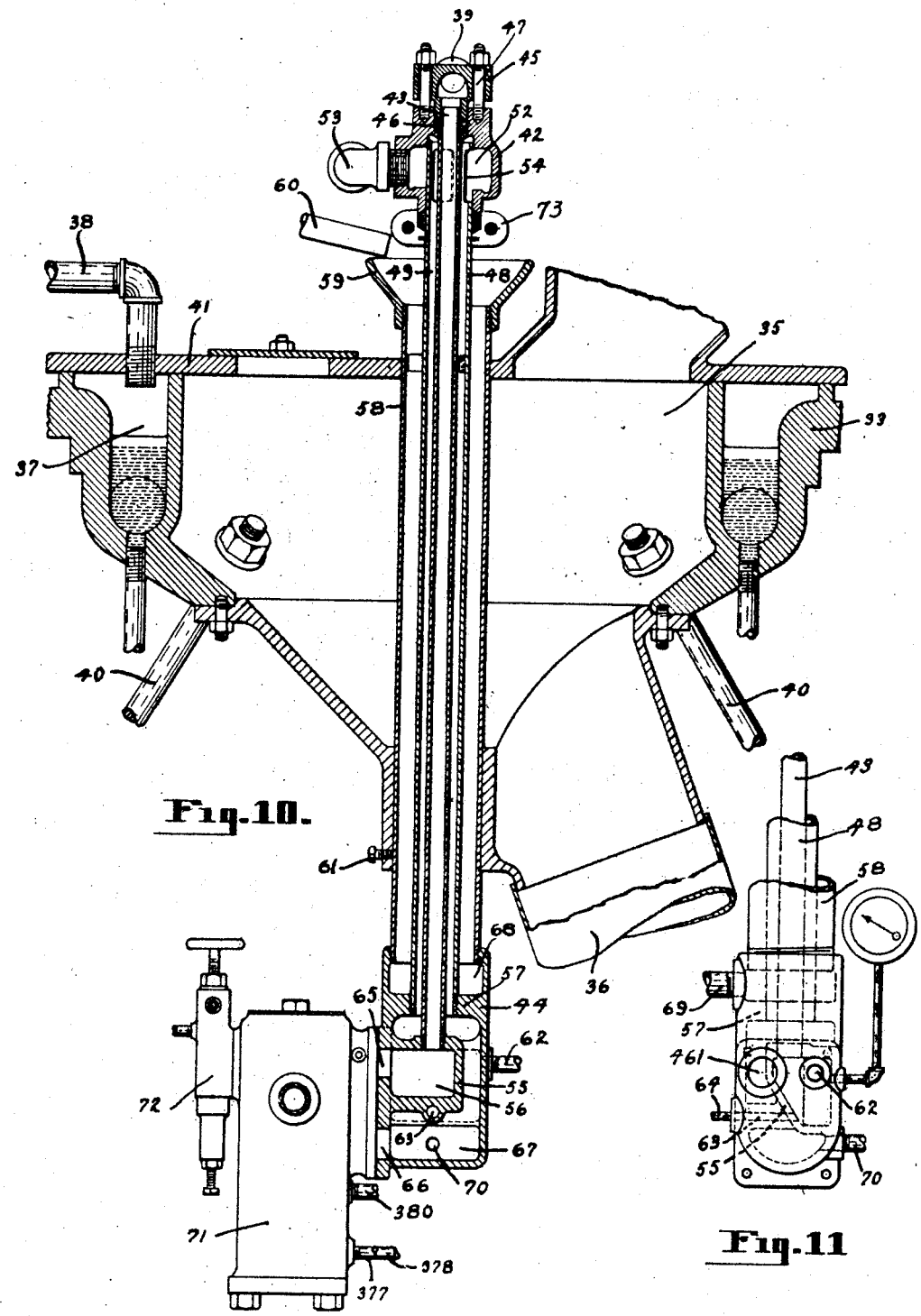

Aug. 12, 1930.  H. F. SMITH  1,772,643
GAS PRODUCER
Filed April 27, 1922 13 Sheets-Sheet 9
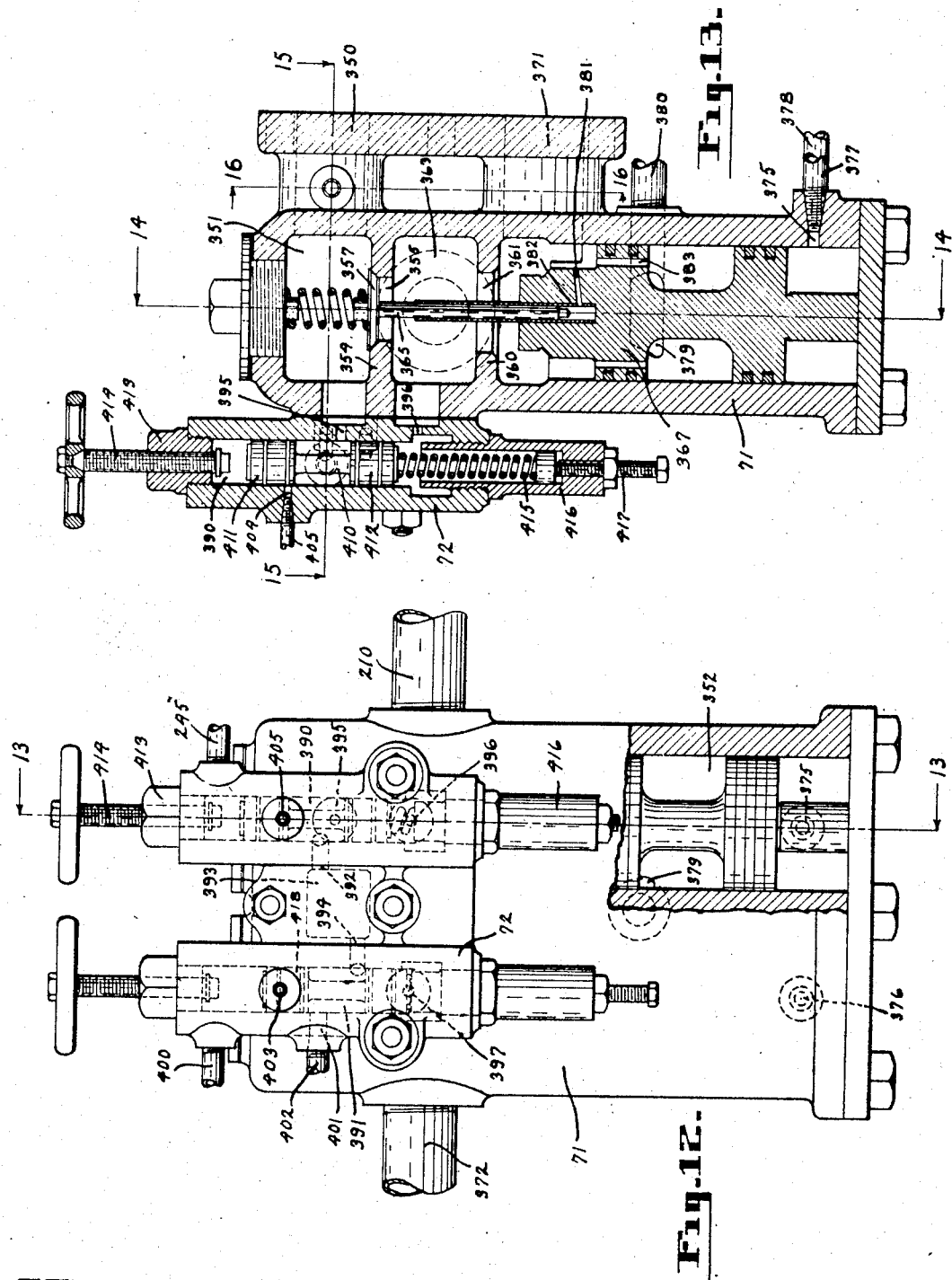
Witnesses
Charles E. Greene
Edmund C. Sybir
Inventor
Harry F. Smith
By Guer Marielle
Attorney

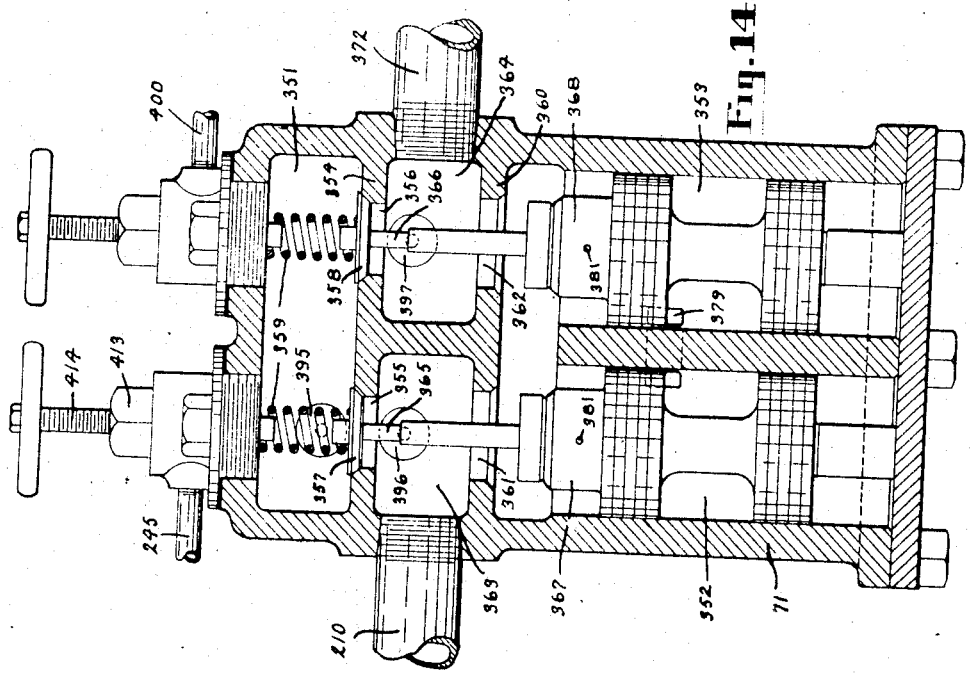
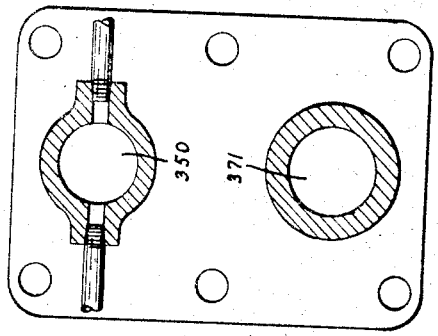
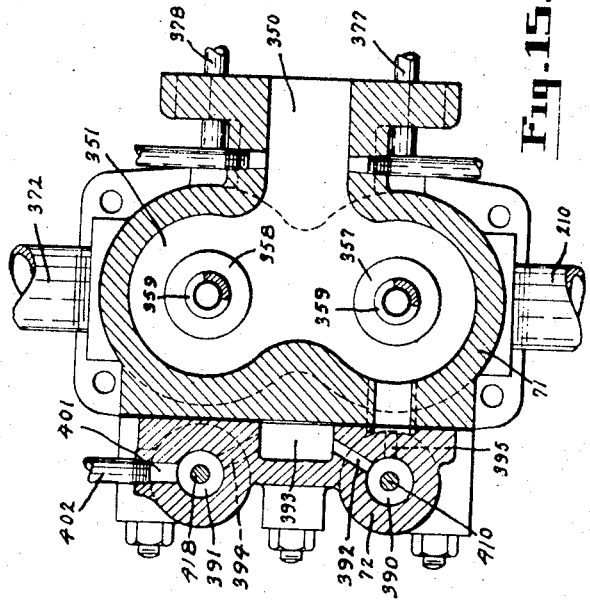

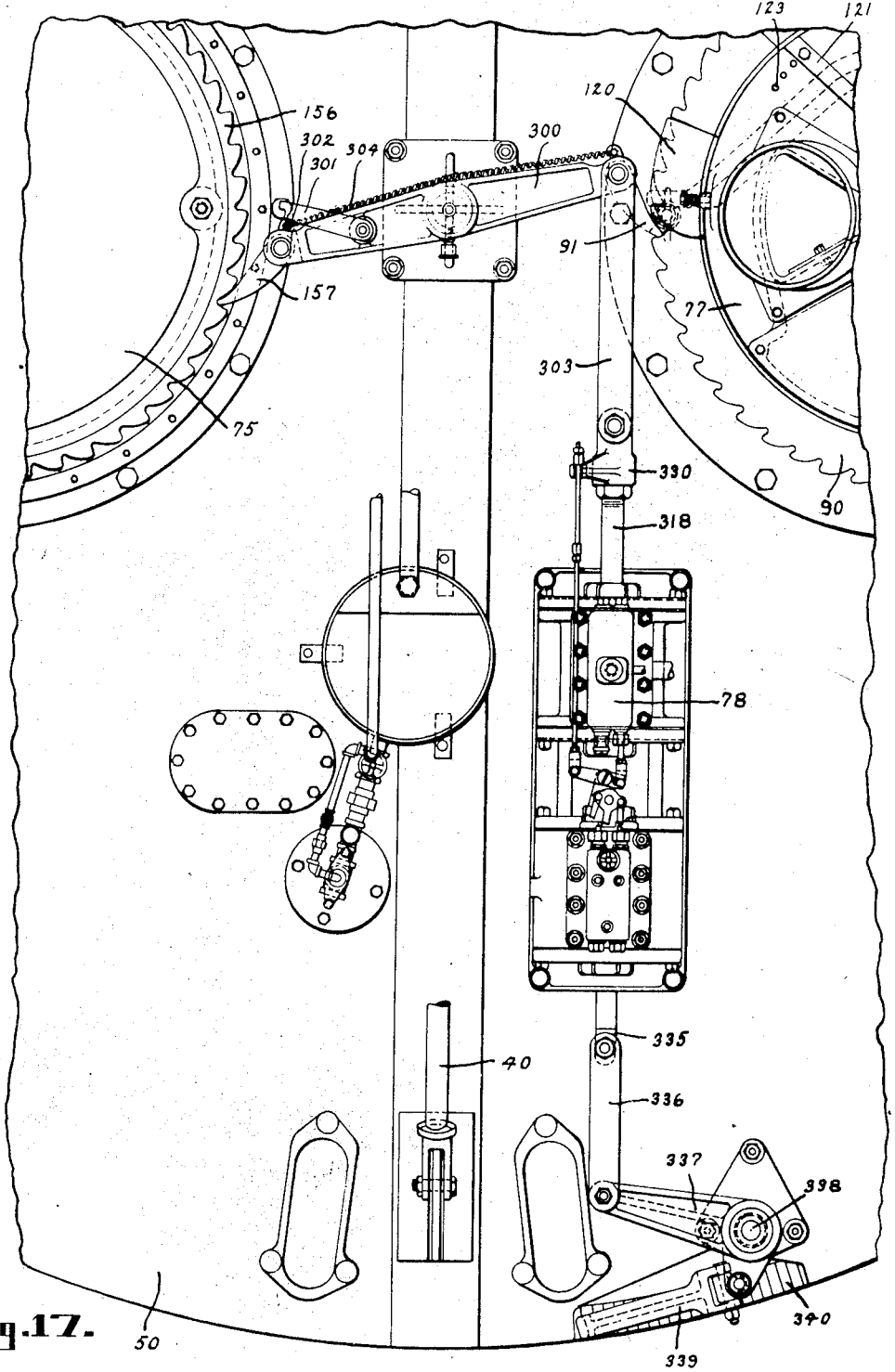

Aug. 12, 1930.　　　H. F. SMITH　　　1,772,643
GAS PRODUCER
Filed April 27, 1922　　13 Sheets-Sheet 12

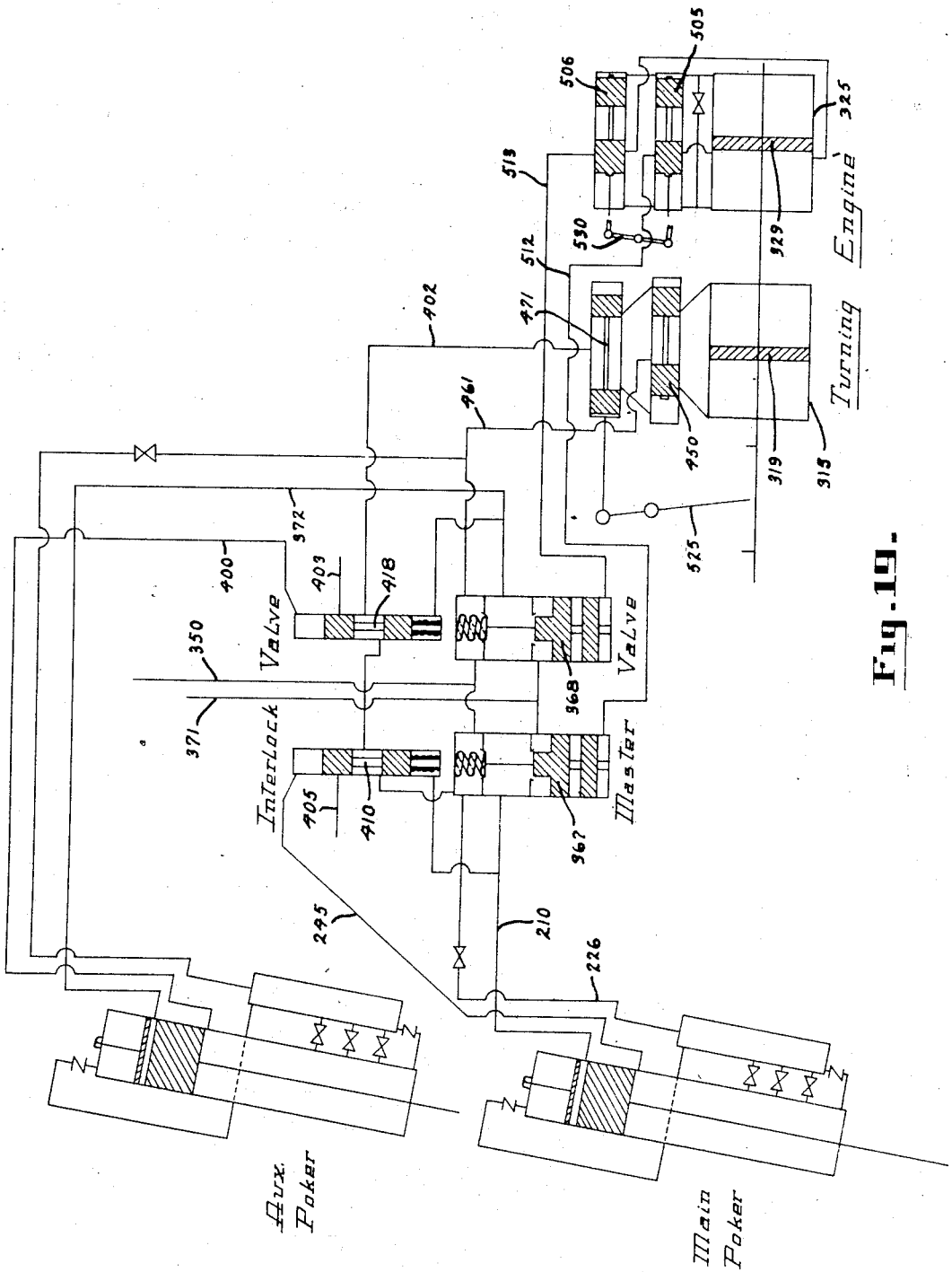

Patented Aug. 12, 1930

1,772,643

UNITED STATES PATENT OFFICE

HARRY F. SMITH, OF DAYTON, OHIO, ASSIGNOR TO THE GAS RESEARCH COMPANY, OF DAYTON, OHIO, A CORPORATION OF OHIO

GAS PRODUCER

Application filed April 27, 1922. Serial No. 556,853.

This invention relates to gas producers, and more particularly to an improved method of gas generation, and to a producer, adapted to effectively carry out that method, in which the various functions of the producer, such as the feeding of the fuel, the agitation of the fuel bed, and other operations are carried on by mechanical means.

One of the principal objects of the invention is to provide an improved method of gas generation in which gas of better than normal characteristics is obtained in greater quantities, for a given size producer, with an improvement in operating conditions.

Another of the objects of the invention is to provide a producer for carrying out this improved method of gas generation in which mechanical means are provided for carrying on the various activities of the producer, thus reducing to a minimum the amount of manual labor necessary during operation.

Other objects and advantages will be apparent from the description set out below when taken in connection with the accompanying drawing.

In the drawing, in which like characters of reference designate like parts throughout the various views thereof:—

Figure 1:
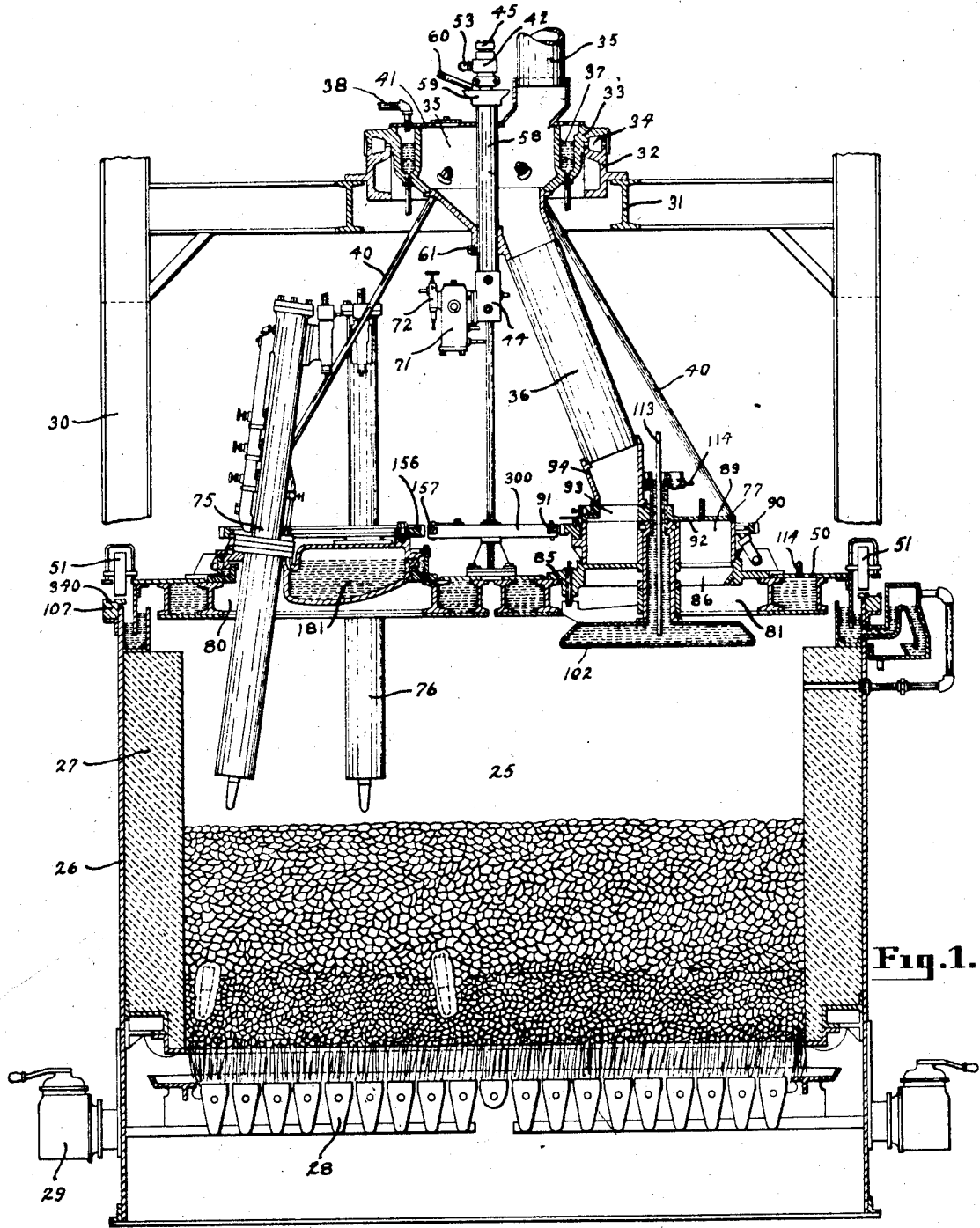
Fig. 1 is a sectional view through a producer constructed in accordance with this invention, along the line 1—1 of Fig. 2.
Figure 2:
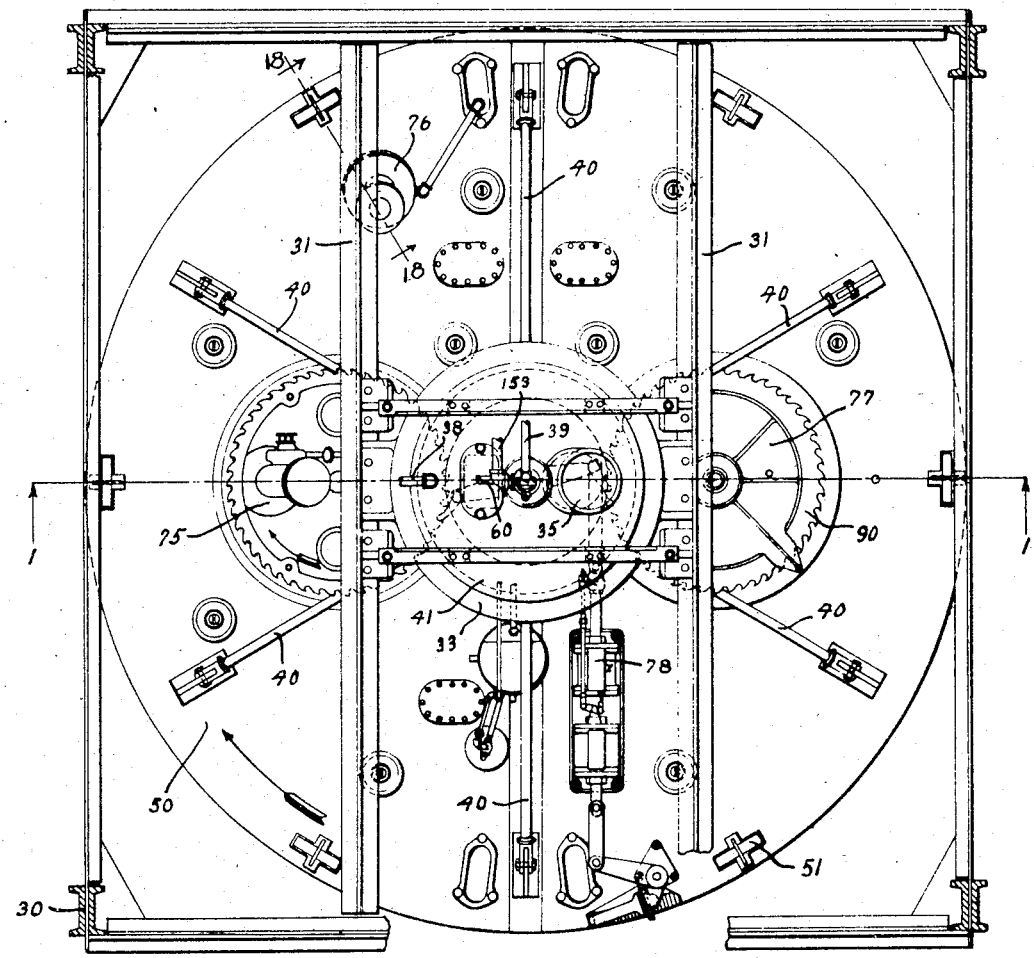
Fig. 2 is a plan view of the producer shown in Fig. 1 with certain parts broken away to more clearly illustrate the invention.
Figure 6:
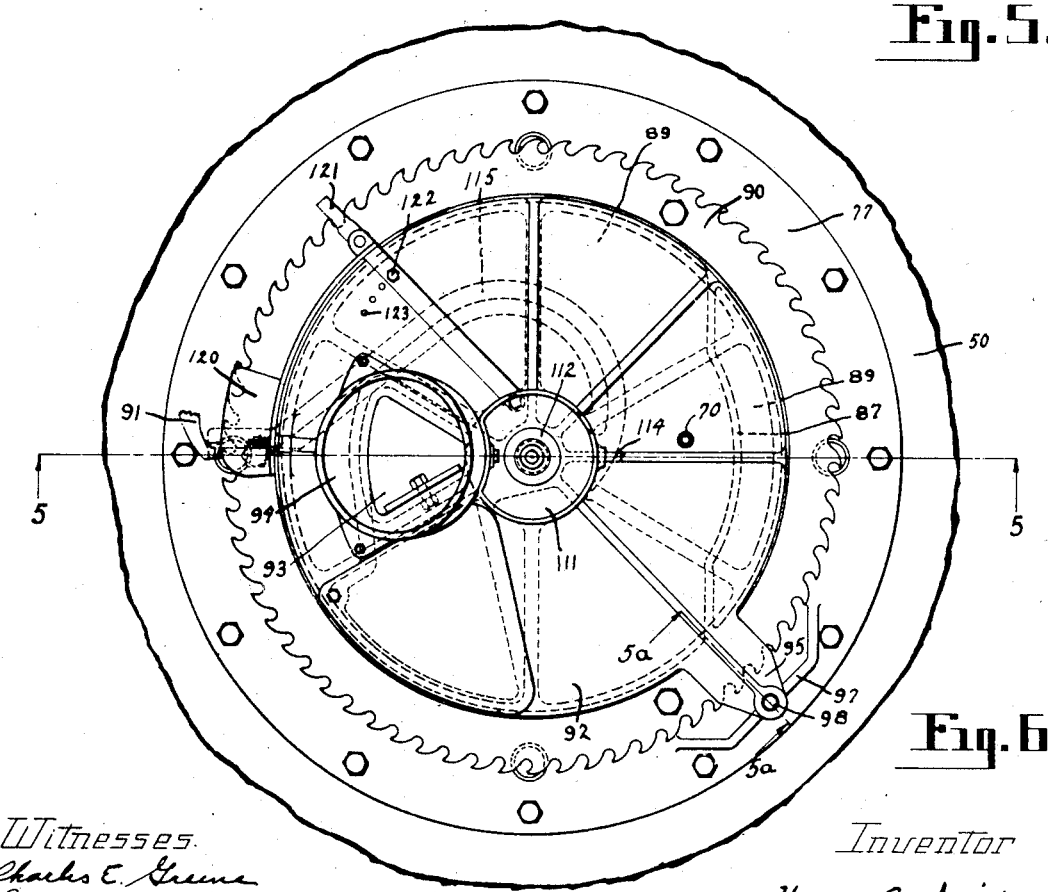
Figure 7A:
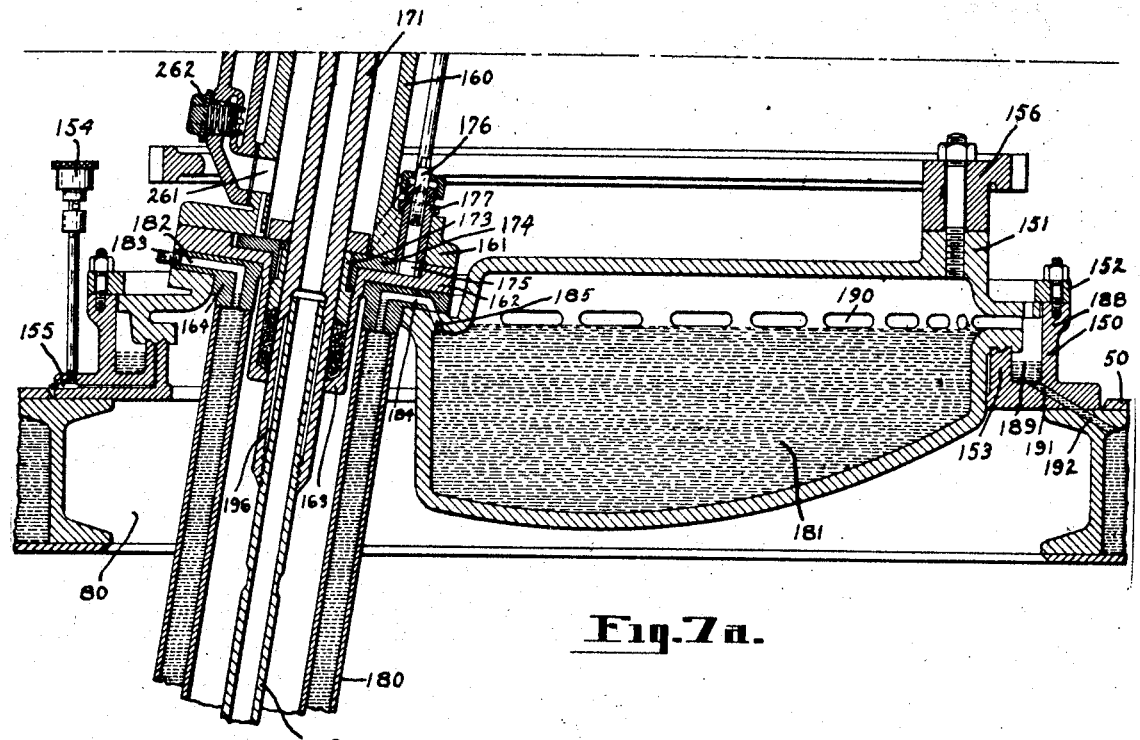
Figure 22:
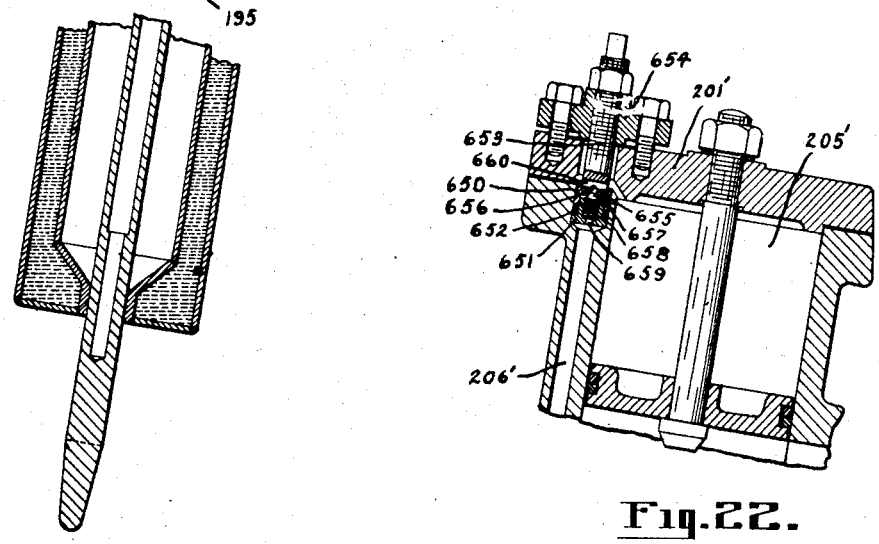
Figure 18:
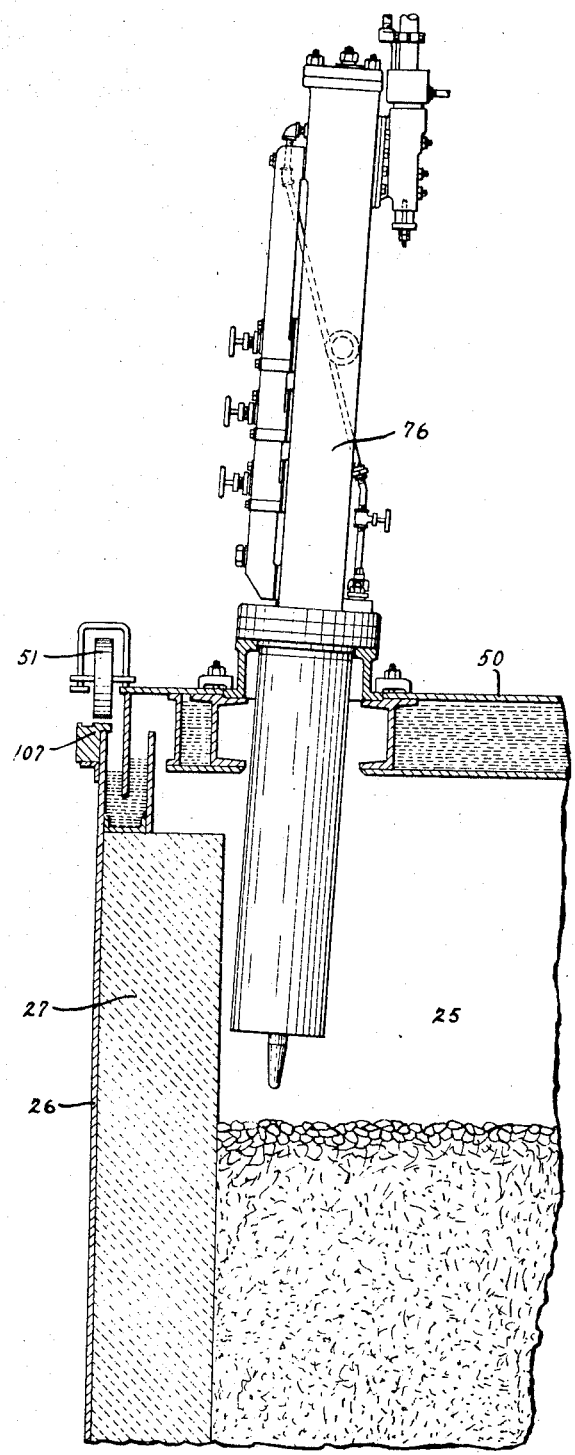

Fig. $5^a$ is a fragmentary sectional view showing certain details of construction of the fuel feeding mechanism, the section being along the line $5^a$—$5^a$ of Fig. 6;

Fig. 6 is a plan view of the fuel feeding mechanism;

Figs. 7 and $7^a$ show, in vertical section, the main poking mechanism;

Fig. 8 is a fragmentary vertical sectional view of one of the elements of the poking mechanism shown in Figs. 7 and $7^a$;

Fig. 9 is a fragmentary sectional view along the line 9—9 of Fig. 7, showing certain details of construction;

Fig. 10 is an enlarged vertical sectional view through a part of the superstructure and supporting apparatus, shown at the top of Fig. 1;

Fig. 11 is an elevational view of the fitting shown in section at the bottom of Fig. 10;

Fig. 12 is an elevational view, with certain parts thereof broken away to more clearly disclose the construction, of the master valve, the view being at right angles to the elevational view of that master valve shown in Fig. 10;

Fig. 13 is a sectional view through the master valve along the line 13—13 of Fig. 12;

Fig. 14 is a sectional view through the master valve along the line 14—14 of Fig. 13;

Fig. 15 is a sectional view through the master valve along the line 15—15 of Fig. 13;

Fig. 16 is a sectional view along the line 16—16 of Fig. 13;

Fig. 17 is an enlarged plan view of a part of the top of the producer, showing particularly the general arrangement of the mechanism for rotating the top and the fuel feed, and for rotating the turret carrying the main poker mechanism;

Fig. 18 is a view, along the line 18—18 of Fig. 2, showing the auxiliary poking mechanism, in elevation;

Fig. 19 is a diagrammatic view showing the arrangement of the two pokers, the turning engine, the master valve and interlock valves associated therewith, and the pipes connecting these various elements of the invention;

Figs. $20^a$, $20^b$, and $20^c$ are fragmentary views, in plan, showing the positioning of certain elements of the control mechanism at different stages during the operation of the device;

Fig. 21 is a detail view, somewhat diagrammatic in character and partly in vertical section and partly in elevation, of the tar return apparatus; and Fig. 22 is a fragmentary vertical sectional view of a slightly modified form of part of the poker mechanism.

The invention forming the subject matter of this application constitutes an improvement on the invention disclosed in the copending application of Harry F. Smith Serial No. 398,750 filed July 24, 1920.

In the apparatus shown in the drawing the numeral 25 designates generally the body portion of a gas producer, which comprises a metallic shell 26 having a lining 27, of firebrick or some analogous material, and a grate 28 comprising a plurality of pivoted grate bars adapted to support a fuel bed. A pressure operated shaking mechanism 29 is associated with the grate for facilitating the removal of ashes from the lower zone of the fuel bed.

Extending upwardly from the foundation supporting the body portion is a frame-work 30, of metallic members or beams, which is adapted to support the top of the producer, along with the various parts of mechanism carried by such top. As shown in Figs. 1 and 2 of the drawing this frame-work 30 has at the top thereof certain members, or cross-beams, 31 adapted to support a hollow flanged member 32 which carries the lower race of a roller bearing. The member 33 carries the upper race of the bearing, and the two members 32 and 33 are held in spaced relation by means of the rollers 34 which cooperate with the races carried by the two members, these parts constituting a roller bearing which sustains the entire weight of the top and mechanism carried thereby. The member 33 has a somewhat funnel shaped opening or passage 35 therethrough which is connected at its upper end by means of a suitable conveyor pipe 35' to the hoppers, not shown, in which fuel is stored, and at its lower end to a conveyor member 36, the lower end of which opens into the fuel feeding mechanism. Surrounding the passage 35 is a trough 37 adapted to receive cooling fluid from a pipe 38. A suitable cover or top 41 is provided for closing the upper end of the passage 35.

Attached to the member 33 and extending downwardly therefrom are a plurality of supporting rods 40, each of which is rigidly attached at its lower end to the top 50 of the producer. By means of these rods the producer top, with the mechanism carried thereby, is supported from the roller bearing. The diameter of the roller bearing is relatively small, when compared with the diameter of the producer and of the top thereof, the bearing, in actual practice, being made as small as may be and still permit of its safely sustaining the weights carried by it. By means of this method of suspension the difficulties attendant upon maintaining the top in proper horizontal adjustment are taken care of very satisfactorily. In addition the use of a bearing of small diameter permits of rotating the top with a comparatively small expenditure of power, the less the diameter of the bearing the less the amount of power required. In order to assist in maintaining horizontal balance of the top a plurality of rollers or sway bearings 51 are attached thereto, which coact with a track 107, carried by the body portion of the producer, to sustain any unbalanced weights placed on the top.

Inasmuch as the top of the producer, in the modification shown, is adapted to rotate the pipes which lead to the top, must be so arranged as to permit of such rotation. This is accomplished with regard to the pipe 38 supplying cooling fluid by not connecting that pipe to the top mechanism, but by positioning the open end of this pipe so that it will empty into the trough 37 of the roller bearing, the cover 41, being in slidable contact with the upper end of the member 33 and maintained stationary, so that the member 33 rotates thereunder. Obviously such arrangement is not expedient with the pipe supplying the pressure, or operating, fluid. This pipe 39, is connected to a fitting 42, which has a passage therethrough adapted to receive, in sliding engagement, the upper end of the pipe 43, the lower end of which is threadedly engaged with another fitting 44, which fitting is rigidly supported upon the mechanism mounted upon the top of the producer, and is, therefore, adapted to rotate therewith. The pipe 39 may be connected to the fitting 42 in any suitable manner, but as shown this connection is accomplished by connecting that pipe to one leg of the elbow member 45, the other leg of which is so constructed that it will fit into the upper end of the passage within the fitting 42, and will receive the upper end of the pipe 43 therein, suitable packing material 46 being provided to make a tight joint, and prevent leakage. Preferably the member 42 carries stud bolts 47, the upper ends of which extend through suitable extensions on the elbow member 45, so that this member may be clamped tightly in position, and the packing 46 adjusted to compensate for wear or leakage. The lower part of the passage in the fitting 42 is enlarged to receive the upper end of the pipe 48, which is of greater diameter than the pipe 43 and adapted to surround that pipe and leave a passage 49 between the two pipes. The upper end of this pipe is slidably mounted within the passage in the fitting 42, and is surrounded by an enlargement 52, to which is connected the exhaust pipe 53, suitable ports 54, being provided in the pipe 48, to connect the interior thereof to the enlarged space 52. Surrounding the pipe 48 and associated with the fitting 42 is a split housing 73 which serves to receive suitable packing material for preventing leakage from the space 52 into the atmosphere.

The lower end of the pipe 48 is also threadedly connected to the fitting 44. The fitting 44 is hollow, throughout its length, and is provided with a wall 55, which is completely inclosed within the space in the fitting 44 and in turn incloses a portion of that space to form the closed chamber 56. The upper portion of the inclosing wall 55 has a threaded port therein adapted to receive the lower threaded end of the pipe 43. Located above the wall 55 and the inclosed chamber 56, is a transverse partition 57, which extends entirely across the space within the fitting 44, this partition being provided with an internally threaded port which is of sufficient diameter to receive the threaded lower end of the pipe 48, the pipe 43 extending through this port, the end thereof which is connected to the chamber 56 being positioned at a lower horizontal level than the partition 57. The upper end of the fitting 44 is substantially unobstructed, the inner wall, adjacent this upper end, being suitably threaded to receive the pipe 58, which is of still greater diameter than the pipe 48 and which extends upwardly through the top member 41, being preferably provided with a flared fitting 59, adapted to ccoperate with the end of the pipe 60, through which tar, or the like, is introduced during operation of the producer, this tar being fed to the generating chamber of the producer in a manner later to be described. Since the pipes 43 and 48 are slidably mounted within the fitting 42 they offer very little support for the fitting 44 and its associated mechanism. But the pipe 58, is rigidly attached to the member 33 by means of a suitable set screw 61, or in any other suitable way. The wall of the fitting 44 is provided with a port, to which is attached the pipe 62, the port being so positioned that the pipe is connected to the space 56. The fitting 44 is also provided with a passage 63, one end of which opens into the space 56, the other end of which receives the pipe 64. The fitting 44 is also provided with a port 65, which opens into the space 56, and another port 66 which opens into the space within the lower part of the fitting, beneath the partition 57, which surrounds the chamber 56, this space being designated generally by the numeral 67. The space in the upper part of the fitting 44 above the partition 57, which space is designated generally by the numeral 68 is provided with a port to which the pipe 69 is connected. The space 67 is also provided with another port to which the pipe 70 is connected.

The pipe 39 is adapted to supply pressure fluid, preferably steam, for operation of the producer, the pipe 53 serving to carry off the exhaust steam resulting during the operation of the mechanism, the fitting 44, with its various passages, and ports serving to assist in the proper distribution of the pressure steam, and the proper distribution of the exhaust steam, during operation of the device. The pressure steam introduced through the pipe 39, and the connecting pipe 43 is supplied to a reciprocating engine, which serves to rotate the top of the producer, and also to rotate the turret carrying the main poking mechanism and certain elements of the fuel feeding mechanism, and also to the main poker and the auxiliary poker to cause proper reciprocation of those pokers.

In order to assist in the description of the apparatus, and to facilitate an understanding thereof, it is perhaps well to state here, in general terms, the principal elements of the apparatus and their general method of operation. As shown generally in Figs. 1 and 2 the producer is provided with a main poking mechanism designated generally by the numeral 75, an auxiliary poking mechanism designated generally by the numeral 76, a fuel feeding mechanism designated generally by the numeral 77, and with an operating motor or turning engine designated generally by the numeral 78, this motor as shown consisting of a reciprocating steam driven engine.

In the agitation or poking of the fuel bed, in the apparatus disclosed herein, all stirring of the fuel bed is avoided, the poking mechanism being so constructed that the poker or bar, proper, is caused to reciprocate, during operation of the producer, so that it moves into and out of the fuel bed, substantially as does a hand-operated poker or bar. As stated there are, preferably, a main poking mechanism and an auxiliary poking mechanism, which are substantially identical in construction except that the main poking mechanism is mounted upon a rotatable turret and at a suitable inclination, so that during operation of the device the poker or bar proper will be caused to uniformly agitate substantially the entire fuel bed, while the auxiliary poking mechanism is rigidly mounted upon the top of the producer, and adjacent the periphery of that producer, so that as the top of the producer rotates the auxiliary poker will be caused to act upon the zone of the fuel bed which is immediately adjacent the wall or lining of the generating chamber of the producer, to break down clinkers, which may become attached to the lining of the producer, and to fill up channels or chimneys thus preventing wall action. The main poking mechanism and the auxiliary poking mechanism each consists, essentially, of a steam cylinder having a reciprocating piston therein, to which is attached an extension or prolongation in the form of the poker or bar proper, the construction being such that upon proper admission and exhaust of steam, or other pressure fluid, to either of the poker cylinders, the piston therein will be caused to reciprocate to drive the poker proper into the fuel bed and to lift it out of the fuel bed.

Inasmuch as the apparatus is constructed to secure agitation of the fuel bed solely by reciprocation of the pokers, the operating mechanism is purposely so constructed and controlled that the pokers are forced into the fuel bed only during such time as the top and body portion of the producer are relatively stationary, and the controlling mechanism is further so arranged that so long as either of the pokers is in lowered position, rotation of the top cannot take place. Furthermore the operation of the pokers is preferably so controlled that they function alternately, first the main poker functioning and then the auxiliary poker. In order to secure these desired results suitable control mechanism is provided, for coordinating the operation of the two poking mechanisms, and the operation of the engine 78, so that both pokers will not be actuated at the same time and so that the engine cannot function to rotate the top of the producer if either of the pokers is in lowered position. In order to properly distribute the load upon the engine the apparatus is so arranged that the turret carrying the main poker and the top of the producer are rotated upon one stroke of the engine, while the fuel feeding mechanism is rotated upon the return stroke, one of the two poking mechanisms being also caused to function during this same time to agitate the fuel bed.

In order to accomplish the desired control of the engine and of the poking mechanism, the apparatus designated generally by the numeral 71, which for purposes of description is termed the "master valve", and the apparatus directly associated therewith which is designated generally by the numeral 72 and is for purposes of description termed the "interlock valve", is provided. The master valve and the interlock valve are associated with the fitting 44 so that proper control of the pressure and the exhaust steam will be secured to cause the desired functioning of the engine and of the two poking mechanisms. The master valve and the interlock valve are so constructed, and arranged with relation to each other, that they control both the distribution of steam to the engine, for operating that engine, and also the supply of steam to each of the poking mechanisms. And the construction and arrangement is such that so long as both of the poker members proper are in elevated position the supply of pressure steam to the cylinder of the turning engine is controlled only by the valve mechanism of the engine itself, but if either of these poker members proper is in lowered position, and is thus extending downwardly a greater or less distance into the fuel bed, the positioning of the engine distributor valve is so controlled that operation of the turning engine is interrupted irrespective of the position of the valve mechanism of the turning engine. Furthermore the master valve, is so constructed, and arranged with relation to the turning engine, that when that engine is moving in one direction, which is the direction corresponding to the time when the top and the turret of the main poking mechanism are being rotated, the supplying of pressure steam to the poking mechanisms, tending to cause such reciprocation of the pistons in either of those mechanisms as will force the poker proper into the fuel bed is prevented; but on the other stroke of the turning engine, during which time the fuel feed is being operated, and the body portion and top are relatively stationary, the master valve will be so actuated as to supply operating pressure steam to one or the other of the two poker mechanisms to cause that particular poker mechanism to function. This construction is such that first one poker and then the other will be caused to function, but both will not be caused to function at the same time.

Keeping clearly in mind this brief general description of the method of operation of the apparatus as a whole, the specific construction and operation of the apparatus may be clearly seen.

The top 50, of the producer, is provided with two openings 80 and 81, each of which is eccentrically arranged with respect thereto, the opening 80 being adapted to receive the main poking mechanism 75, while the opening 81 receives the fuel feeding mechanism 77.

This fuel feeding mechanism comprises a base member 85 which is rigidly secured to the top of the producer, and which covers and extends partly into the opening 81 therein. This base member has a port 86 therein, preferably sector-shaped, which serves as a fuel discharge aperture, through which fuel is introduced into the generating chamber within the body member 25 of the producer. A deflector 87 is provided beneath this opening, but this member may be dispensed with if desired, or it may be of different construction, its purpose being to direct the course of the fuel as it falls through the aperture 86.

Rotatably mounted upon the upper surface of the base member 85 is a disc member 88 having a plurality of ports or pockets 89 therein. These pockets are preferably sector-shaped, as shown in dotted lines in Fig. 6, and in shape and size correspond to the discharge aperture 86. Carried by the member 88, and upon the outside thereof, is a toothed rack 90, the teeth of which are adapted to cooperate with an operating pawl 91, driven by the engine 78. Mounted upon the rotatable disc 88 is a top or hopper member 92 having a fuel supply aperture 93 therein adapted to cooperate with a passage 94 which in turn receives the lower end of the fuel supply pipe or conveyor 36. The supply aperture 93 is also a sector shaped port, and is so positioned that as the disc member 88 rotates each of the pockets 89 will in turn register with the aperture 93 to receive fuel therein. The discharge aperture 86 is also so positioned that as the disc member 88 rotates each of the pockets 89 will register therewith to discharge the fuel in such pocket through said aperture into the producer. The hopper member 92 and the base member 85 are held stationary, with relation to each other, by means of a pin 98 which passes through an extension 95, carried by the hopper member, and seats in a socket within the upwardly extending member 96 carried by the base member 85. As shown particularly in Fig. 6 the upwardly extending member 96 has bracing webs 97 attached thereto to strengthen it, but these webs of course may be omitted if desired. The contacting faces of the members 85, 88 and 92 are properly machined to fit with a gas-tight joint, and the base member 85 and hopper member 92 are so positioned relative to each other that the aperture 86 and the aperture 93 are at no time, during operation of the device, brought into direct communication with each other. As the disc member 88 is rotated, during operation, each of the pockets or ports 89 therein is brought alternately into register with the supply aperture 93, to receive a charge of fuel, and with the discharge aperture 86, to discharge the fuel within such pocket into the generating chamber of the producer. By means of this arrangement the generating chamber of the producer is never brought into direct communication with the outside, and passage of air or gas therethrough is consequently very largely eliminated. As each pocket 89 comes into communication with the aperture 86 and discharges the fuel therein into the producer, however, that pocket may fill up with gas, and upon further rotation of the disc member to bring that pocket into register with the supply aperture 93, to receive a new supply of fuel therein, the gas within such pocket will be displaced and will pass upwardly through the pipe 36 whence it will escape into the atmosphere. And the amount of gas that may thus escape into the atmosphere may be sufficient in quantity to interfere with the comfort of the operator, and at times so considerable as to dangerously poison the atmosphere.

In order to prevent this transfer of gas from the producer out into the atmosphere the pipe 70, which leads off from the space 67 of the fitting 44 passes through the hopper member 92 and has its end terminate in such position that it is in register with each of the pockets 89 when such pocket is in register with the discharge aperture 86. During operation exhaust steam is supplied through the pipe 70 so that as each pocket 89 registers with the discharge aperture 86 that pocket becomes filled with steam which prevents the inflow of gas thereinto. When the disc 85 progresses sufficiently to bring the steam filled pocket into register with the supply aperture 93 there may be a slight escape of steam into the atmosphere, but the quantity is so small as to be negligible. The copending application of Harry F. Smith, filed Feb. 25, 1918, Serial No. 219,069, which has matured into Patent No. 1,425,145, discloses a fuel feeding mechanism in which steam is fed to a fuel distributing member to prevent the transfer of gas therethrough, an adaptation of the same idea being shown in this invention.

Mounted in the passage 99, in the rotatable member 88, is a hollow shaft 100, which extends through the opening 101 in the base member 85, and has a hollow fuel receiving member or plate 102 carried upon the lower end thereof. The shaft 100, and receiving member 102, are supported from the disc member 88 by means of a bearing ring 103 which is held in place within a groove 104 in the upper end of the shaft, the ring coacting with the shoulder 105 within the passage 99. The shaft 100 is keyed to the disc member 88 by means of the key 106, so that upon rotation of the member 88 the shaft and the plate 102 carried thereby will be correspondingly rotated. Removably attached to the upper end of the hollow shaft 100 is a pipe 108 which passes upwardly through opening 109 in the hopper member, a collar 110 held in place by a set screw, surrounding said pipe and serving to help sustain the fuel receiving member, and to also prevent leakage around the pipe through the opening 109. Carried by the hopper member and surrounding the pipe 108 is a cylindrical trough-shaped member 111, the upper end of the pipe 108 having an overhanging flange 112, which encloses the inner upturned portion of the trough shaped member 111. Passing downwardly through the pipe 108, the hollow shaft 100, and terminating within the hollow member 102 is a pipe 113, connected to any suitable source of supply of water or other cooling fluid. Through this pipe cooling fluid passes into the member 102, thence upwardly through the hollow shaft 100 and pipe 108 whence it overflows into the trough-shaped member 111, the overhanging flange 112 preventing the leakage of water between the inner upturned portion of the trough-shaped member and the pipe 108. Leading off from the trough-shaped member is a pipe 114 through which cooling water escapes and passes into the hollow top of the producer. Of course, if the top of the producer is not water cooled, this water will be run off into any other suitable place.

Figure 5:
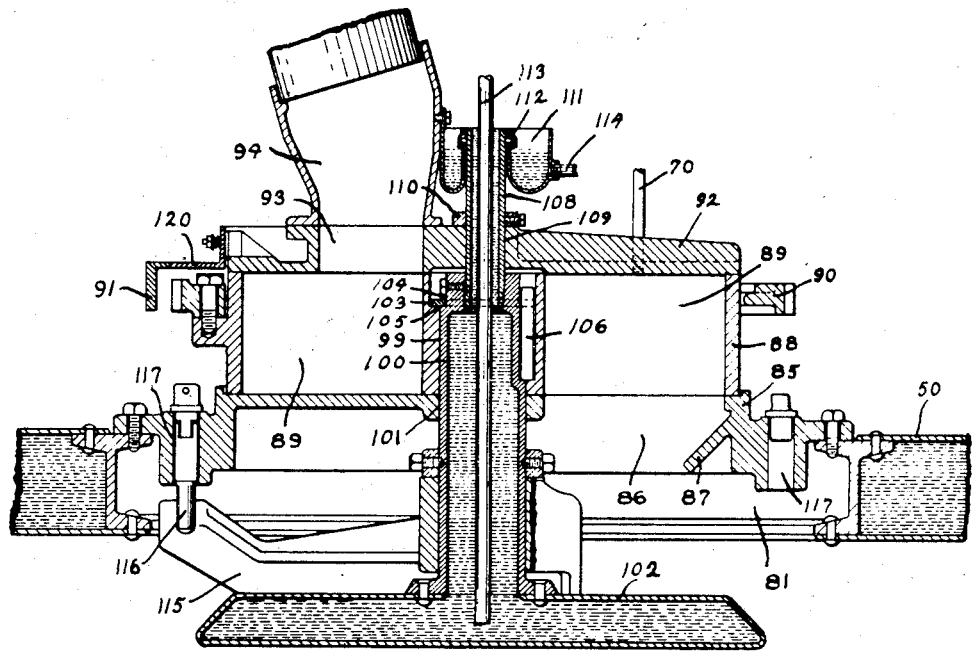
Fig. 5 is a sectional view through the fuel feeding mechanism along the line 5—5 of Fig. 6.

Rotatably mounted upon the hollow shaft 100 is a scraper member 115 which, as shown in Figs. 5 and 6, consists of a curved arm adapted to rest upon the upper face of the member 102, the free end of the arm extending outwardly beyond the plate and being adapted to contact with a pin 116, inserted through a hole 117 within the base member 85. A plurality of these holes 117 is provided, each of which is adapted to receive the pin 116, so that the positioning of the scraper member 115 may be varied to meet any desired operating conditions. Inasmuch as the member 102 is, during operation, rotated, and the scraper member 115 held stationary, the member 102 thus rotating under this scraper member, any fuel deposited upon the upper face of the distributor member, will be, during rotation, pushed over the edge thereof to fall upon the fuel bed below. The scraper member may be given such shape or curvature as is desirable for securing the proper distribution of fuel over the edge of the fuel receiving member. The proper curvature of the scraper for any given conditions may be determined mathematically; but it is generally more satisfactory to determine it by actual test. Since the member 102 rotates and the scraper member remains stationary the fuel may be dropped upon any part of the upper surface of the member 102 without affecting the proper distribution thereof. This feeding mechanism being adapted for use with a gas producer having a rotatable top and stationary fuel bed, is located eccentrically to the fuel bed. In such a construction it is necessary, in order to secure a uniform distribution of the fuel over the fuel bed, that more fuel be fed to the outer portions of the fuel bed than to the central portion. The apparatus illustrated has the scraper arm 115 so shaped that during rotation of the top 50 the fuel will be pushed over different portions of the edge of the plate 102 at varying rates, to feed a greater quantity of fuel to the outer portions of the fuel bed than to the central portion. In the drawing the aperture 86 is shown so positioned as to discharge fuel upon the outer part of the member 102, but this is merely a preferred design, as it is a matter of indifference, so far as proper distribution of fuel from the member 102 is concerned, upon what part thereof the fuel is deposited. If desired the fuel could be deposited upon the inner part of the receiving member 102 or upon the center thereof, and the same distribution would take place.

Inasmuch as all fuel which is deposited upon the member 102 will be pushed over the edge thereof by the scraper member, the rate at which fuel is fed to the fuel bed is dependent upon the rate of rotation of the disc-shaped measuring member 88. The pawl 91 has a constant travel, and, in order to control the rate of rotation of the measuring member without varying the speed of operation of the pawl actuating mechanism, a control plate 120, carried by the hopper member 92, is provided whereby the pawl may be held out of engagement with the teeth during a part of its travel, to thus cause the disc to advance the member 88 at any desired rate. This plate is positioned to overlie the teeth of the rack 90, and is of sufficient width to hold the pawl out of engagement with these teeth. By properly positioning this plate, the pawl upon working stroke will advance the disc member one, two, or more teeth at a time, irrespective of the speed of the pawl actuating means. By properly manipulating the pivoted handle 121, the setting of this plate may be varied at will. And the setting of the handle and the control plate may be maintained by means of the bolt 122 which is arranged for positioning within a hole in the handle and some desired one of the holes 123 in the hopper member 92.

The main poking mechanism 75 is shown in detail particularly in Figs. 7, 7ª and 8. This main poking or barring mechanism is mounted upon a base member 150 which is rigidly secured to the top of the producer and which carries a rotatable turret member 151, held in position by means of a circular plate or ring 152, secured to the base member by bolts of any suitable character, the arrangement being such that the turret is held in position while the free rotation of the turret upon the member 150 is permitted. As shown particularly in Fig. 7ª the turret is seated upon an upstanding flange 153, the coacting faces of the turret and flange being in slidable contact with each other, a grease cup 154, and a cooperating passage 155, which terminates at the meeting surfaces of the turret and flange 153, being provided for supplying a suitable lubricant to these contacting surfaces. Carried by the turret is a toothed rack 156, the teeth of which are adapted to coact with the pawl 157, which is in turn operated by the engine 78.

Mounted upon the turret, and eccentrically positioned relative thereto, is the poker mechanism proper, which is so mounted that it is inclined to the vertical. This poker mechanism comprises a cylinder 160 which is provided at the lower end thereof with an outstanding flange 161. Cooperating with the flange 161 is the corresponding flange 162, of the stuffing box 163, the flange 162 being positioned between the flange 161 and a correspondingly flanged member 164, which in turn cooperates with the turret member, the three flanges being rigidly secured together, and rigidly secured to the turret, by means of bolts, of any suitable conventional character, the construction being such that the poker mechanism is rigidly secured to the turret, and is constrained to move therewith, as the turret is rotated during operation of the producer.

Mounted within the cylinder 160 is a hollow piston 170 to which is attached the hollow piston rod 171, the piston rod constituting the poker proper of this mechanism, the proportions of the piston and poker and the location of the poking mechanism, being such that upon reciprocation of the piston in one direction the poker proper is driven into the fuel bed a predetermined distance, and upon reciprocation in the other direction the poker is entirely withdrawn from the fuel bed. Packing material of any suitable character such as asbestos wicking or the like, is positioned within the stuffing box 163, around the piston, and a gland 173 is threadedly mounted within the stuffing box, and in contact with the packing, the construction being such that any desired pressure of the packing may be secured by proper manipulation of the gland. In order to permit ready adjustment of the gland, to secure suitable compression of the packing to maintain a tight joint around the piston and prevent leakage of steam therealong, a gear 174 is keyed to the gland in such wise as to permit longitudinal movement of the gland and gear relative to each other but to insure rotation of the two together. This gear is adapted to mesh with a pinion 175, carried upon the rotatable shaft 176, journaled within a suitable bushing 177, mounted in a passage in the flange 161, the free end of which shaft is shaped to receive a wrench or other operating tool. Rotation of the shaft 176 will cause corresponding rotation of the gear 174 to advance or retract the gland with a consequent increase or decrease in the compression of the packing. Attached to the member 164, and extending downwardly into the generating chamber of the producer, through the opening 80 is a double walled cooling chamber 180, into which any desired cooling fluid may be introduced for keeping the temperature of the poker and associated parts sufficiently low during operation, the construction being such, as shown clearly in Fig. 7ª, that when the poker is in elevated position it is almost completely withdrawn from contact with the hot gases within the generating chamber, the upper part of the piston rod being at that time housed in the cylinder 160 and the lower part being almost completely housed in the double walled cooling chamber 180.

The turret 151 is preferably hollow so as to provide a space 181, for receiving a cooling fluid, such as water. The member 164 is provided with a passage 182, one end of which is connected to the pipe 183 the other end opening into the space within the double walled chamber 180. The member 164 is also provided with a second passage 184, one end of which opens into the double walled space 180 and the other end of which connects with a passage 185, which opens into the space 181 within the turret. The pipe 183 at its upper end is connected to the trough-shaped member 186, which is mounted upon the upper end of the cylinder, water being supplied to the member 186 through the pipe 187, the upper end of which opens into the circular trough 37 within the member 33, of the roller bearing, this trough 37 in turn receiving cooling fluid from the pipe 38, which as stated above, is connected to any suitable source of supply of cooling water. During operation of the device some of the cooling water which is introduced into the trough 37 passes downwardly through pipe 187 into the trough shaped passage 186 thence downwardly through the pipe 183 into the member 180, from which it passes through the passages 184 and 185 into the interior of the turret 181. The base member 150, is so constructed that the upstanding flange 153, which sustains the turret member is spaced a suitable distance from the upstanding flange 188, constituting the outer wall of the base member, to provide the circular trough 189. The turret member is provided with a plurality of ports 190, which pass entirely through the wall thereof so that the water introduced into the turret may overflow through these ports into the trough 189. Leading off from the bottom of this trough is a passage 191, which registers with one end of the corresponding passage 192, within the top 50 of the producer the other end of which opens into the space within the top. The cooling water introduced into the space within the turret therefore overflows into the trough 189 and passes thence into the double walled top of the producer. Of course the water cooled turret may be dispensed with if desired, and also the top need not necessarily be water cooled unless it is desired. But water cooling the turret and top has been found desirable, inasmuch as during operation of the producer those parts will otherwise often become so hot as to make work upon the top of the producer uncomfortable.

If desired the piston rod proper, and the poker proper may be made of a single piece, but preferably the piston rod proper which is designated by the numeral 171, and the poker proper, or that part which actually extends into the fuel bed during operation of the poking mechanism, and which part is designated by the numeral 195 are made in two separate pieces the lower end of the piston rod being provided with a socket 196 adapted to receive the upper end of the member 195. The socket is of such proportions, throughout a part of its length, that the cooperating end of the member 195 has a snug sliding fit therein, the lower end of the member 171 being internally threaded to receive cooperating external threads on the member 195, so that the two may be rigidly secured together. The member 195, is preferably provided with a passage therein registering with the passage within the piston rod, so that the steam, or other pressure fluid, which is introduced into the cylinder to cause reciprocation of the piston 170, and the piston rod and poker member 195 carried thereby, may serve to help cool the poker, which often becomes quite highly heated during operation, despite the fact that it is during the greater part of the time of operation housed within the cooling member 180. While the piston proper and the poker member proper are described as separate elements, it is to be understood that they really reciprocate as one, and consequently throughout the description of the method of operation of the device no attempt is made to always refer to these two members as separate pieces, but they are treated as a single unitary structure.

Reciprocation of the piston within the cylinder 160, with consequent movement of the poker into and out of the fuel bed is accomplished by the suitable introduction of pressure fluid into the cylinder. The pressure fluid used is preferably steam, although any other suitable pressure fluid may be used if desired, such for instance as compressed air. But since considerable quantities of steam are normally used, in operation of the producer, to mix with the air to form the blast which is introduced into the generating chamber to react with the fuel therein to cause the generation of gas, steam is preferably used for the operating fluid, since the exhaust steam can then be fed into a saturator where it will be taken up by the ingoing air in any predetermined proportion, apparatus for giving this predetermined proportioning of the air and moisture being well-known. In actual practice it has been found that the amount of steam needed for furnishing saturation, that is for supplying the requisite amount of moisture in the blast, is as much or more than the total amount needed for operating the turning engine, the pokers, the gas pumps or exhausters, etc.

As described above pressure steam for operating the pokers and other mechanism carried by the top, is introduced through the pipe 39 and the pipe 43 to the fitting 44, the pipe 43 being so connected to the member 33 of the roller bearing that it and the fitting 44 rotate in unison with that member, and with the top of the producer, which is supported from the member 33. If the main poking mechanism were at all times stationary with reference to the top of the producer, and therefore to the fitting 44 and its associated piping, a rigid connection could be made between the cylinder 170 and the said fitting with its cooperating piping. But since the turret 151 is progressively rotated about its own axis, during operation of the producer, while the top is at the same time also rotated about its axis, the poker mechanism proper is continuously shifting its positioning relative to the top of the producer, and to the other apparatus carried thereby. Therefore a rigid connection between the cylinder and the steam piping may not be used. Attached to the upper end of the cylinder 160 is a member 200, which is so connected to the pipe through which pressure steam passes from the fitting 44 to the cylinder that rotation of the upper end of the poker mechanism incident to rotation of the turret is permitted. In securing this desired construction, the member 200 is so arranged that the longitudinal axis thereof passes through the axis of rotation of the turret. In other words the member 200 is so connected, by suitable piping, to the pipes through which pressure steam from the fitting 44 is introduced to the cylinder, that what is in effect a swivel joint is secured, the axis of which is coincident with the axis of the said fitting 200, and is therefore also coaxial with the center of rotation of the turret. Because of this arrangement a suitable swivel connection is provided which permits free rotation of the poker with the turret while at the same time permitting suitable connection of the poker and its associated parts with the various pipes necessary for the supplying of steam thereto, and the exhausting of the steam therefrom.

The upper end of the cylinder 160 is closed by means of a top 201, which is rigidly secured to the cylinder by means of suitable bolts. Mounted within the top 201 is a rod 202, the lower end of which is provided with an enlargement 203 adapted to fit within the upper end of the passage in the piston 170. Slidably mounted upon the member 202 is a piston 204, which constitutes the piston of a dash pot adapted to take up the shock attendant upon bringing the piston 170 to a stop upon its upward or return stroke, the enlargement 203 serving to limit the travel of the piston 204 along the rod 202. The space 205, in the upper end of the cylinder, above the dash pot piston 204 is connected to a passage 206, which is during operation of the device, at all times in communication with pressure steam, so that the pressure within the dash pot will at all times be at least equal to the pressure of the operating steam. A check valve 207 is positioned within this passage so that steam may flow from the passage 206 into the dash pot, but return flow of steam from the dash pot into the passage 206 is prevented. As the piston 170 moves upward upon return stroke the piston 204 is caused to also move upwardly compressing the steam above it, the inertia of the upwardly moving piston 170 being thus absorbed and jarring and pounding of the parts prevented.

Pressure steam is introduced through the pipe 210, suitably connected, in a manner to be later described, with the pipe 39 shown in Figs. 2 and 10. This pipe, which is held stationary relative to the top of the producer is suitably connected to an elbow fitting 211, which has threadedly engaged therewith one end of the pipe 212 the lower end of which extends into the space 213, constituting the enlarged upper end of the passage which extends axially throughout the member 200. The lower end of this pipe cooperates with the ring 214, which seats against the bottom wall of the enlargement 213, suitable packing 215 being positioned within the enlargement 213 around the lower end of the pipe to prevent leakage therethrough. The trough-shaped member 186 is provided with a passage 216, the member 186 being so positioned that this passage is coaxial with the pipe 212 and the passage within the member 200, the construction being such that the pipe 212 passes through the passage 216. The member 186 is also provided with an extension or flange 217 which extends into the enlargement 213 and compresses the packing 215 therein the arrangement being such that the lower end of the pipe 212, and the member 200 are rotatable relative to each other so that during operation the pipe 212, which is rigidly connected to the elbow 211 and thus to the pipe 210 will be held stationary with reference to the top of the producer while the poker, with the attached member 200 will rotate about this pipe. The member 186 is also so constructed that it is relatively rotatable with respect to the member 200 so that it may also be held stationary with respect to the top of the producer while the poker and the member 200 rotate relative thereto.

Interposed between the member 200, the axis of which is vertically arranged, and the cylinder 160, the axis of which is inclined to the vertical is a member 220 which is rigidly connected to the cylinder by means of suitable bolts, the member 200 being in turn rigidly connected to the member 220 by means of the same, or of other, suitable bolts. Of course the member 200 and the member 220 may be made as a single integral piece if desired but for ease of construction these two members are preferably made separate, the two members having cooperating passages which are adapted to register with cooperating passages or ports in the cylinder 160. The axial passage within the member 200 is provided with an inwardly extending flange or partition 221, which separates the enlargement 213 from a second enlargement 222 within this passage, the enlargement 222 being connected to a passage 223, within the member 220, which passage is in turn connected to the port 224 in the cylinder 160. The construction is such that the enlargement 222 is at all times in free connection with the interior of the pipe 212, so that that pipe is at all times connected to the interior of the cylinder through the enlargement 222 the passage 223 and the port 224. The pipe 212, and the connecting pipe 210, which are above referred to as furnishing pressure steam for the operating of the poker are also adapted to function for the purpose of permitting escape of the exhaust steam upon the upstroke of the piston 170. Substantially midway of the length of the axial passage within the member 200 is an inwardly extending flange or partition 225, the opening through which receives the lower end of the pipe 226 the upper part of which passes upwardly through the pipe 212 and through a suitably arranged passage 227, in the elbow 211, and is connected to the member 228, which is in turn rigidly connected to the extensions 229 of the elbow 211. The lower end of the pipe 226 is slidably mounted within the passage in the partition 225, the extreme lower end extending downwardly into the passage 230, this pipe being provided with a plurality of ports 231 which are surrounded by a suitable cage member 232 the openings through which are so arranged that the ports 231 are at all times connected to the passage 233 within the member 200, which passage is in turn connected to the passage 234 within the member 220, that passage being connected to the circular passage or groove 235 within the upper end of the cylinder, the passage 206, within the upper end of the cylinder being also at all times in open connection with the passage 235. Suitable packing is positioned both above and below the cage 232, and a second, and hollow cage 236, is positioned within the lower end of the passage 230, and extends sufficiently far up into this passage to surround the lower end of the pipe 226. This cage is provided with an extension which is surrounded by suitable packing material 237, with which a packing gland 238 cooperates. Tightening bolts 239 are carried by the member 200, their ends extending through the flange of the gland 238 and having nuts 240 thereon, so that by properly manipulating these nuts the gland may be drawn up to compress the packing associated with each of the two cages to prevent leakage along the wall of the passage 230 or along the wall of the pipe 236. By means of this construction the space within the cage 232 is maintained out of connection with the space within the cage 236. Positioned within the pipe 226 is a smaller pipe 245, which extends upwardly therethrough the upper end of this pipe being connected in any suitable manner to the passage 246 within the member 228. The lower end of this pipe 245 has a suitable closure member 247 for closing the lower end of the pipe 226, so that any pressure fluid introduced through the pipe 226, while it may at all times pass freely through the ports 231 and the cage 232 to the passage 233, is prevented from passing downwardly into the hollow cage 236, which is in turn connected to the passage 247 and thence through the passage 248 to the passage 249, within this cylinder. But the lower end of the pipe 245 is unobstructed so that this pipe is at all times in open communication with the space within the cage 236.

The member 228, in addition to the passage 246 which is connected to the pipe 245 is also provided with a passage 250, which is connected to the pipe 226. The elbow 211 is also provided with two passages 251 and 252, which are connected respectively at one end to the passages 246 and 250, and are connected at the other ends, respectively, to the pipes 253 and 254.

Connected to the circular passage 235, within the cylinder 160, is a receiver 260, the lower end of which is connected to the port 261, which is positioned within the extreme lower end of the cylinder, a check valve 262, which may be of any suitable construction being positioned within this passage and so arranged that pressure fluid may readily pass from the receiver 260 into the cylinder, but reverse flow from the cylinder to the receiver is prevented. During operation of the poking mechanism, pressure steam is introduced through the pipes 210 and 212, to the enlargement 222 whence it passes through the port 224 into the passage 263, which is formed by cutting away the upper end of the piston 170. This passage 263 is connected to the passage within the piston and the piston rod 171 by means of small radially arranged passages 264. Pressure tending to force the piston down is thus exerted upon the piston. The pipe 226, is at all times connected to the same source of pressure steam as supplies the pressure steam through the pipe 210. Therefore the passage 235 is at all times connected to pressure steam and, through this passage, the space within the receiver 260 and the space within the cylinder 160 below the piston 170 will thus at all times be connected to pressure steam. And since the pressure per unit area exerted upon the lower face of the piston 170 is the same as the pressure exerted upon the upper face of the piston, when pressure steam is introduced through the pipe 210 the piston will not move downwardly unless the effective area of the surface of the piston exposed to the pressure steam introduced through the pipe 210 is greater than the effective area of the lower face of the piston exposed to the pressure steam within the cylinder below that piston. As arranged the effective area of the piston exposed to the pressure steam introduced through the pipe 210 is greater than the effective area exposed to the pressure beneath the piston 170. And therefore as soon as the pressure steam is introduced through the pipe 210 the piston will move downwardly. As the piston moves downwardly it uncovers the port 249 and thus connects that port, and the pipe 245 which leads to the interlock valve associated with the main poker, to the pipe 210. The control and operating mechanism described generally above is so arranged that the poker does not move downwardly until after the turning engine has started the stroke which causes actuation of the fuel feeding mechanism. As the engine continues this stroke, with the poker piston in lowered position the master valve is actuated to connect the pipe 210 to the exhaust. As a result the interlock valve is also connected to the exhaust and supply of operating steam to the turning engine to cause the reverse stroke, which would cause rotation of the top, is prevented so long as the poker remains down and the interlock valve is thus connected to exhaust. However, pressure steam is at all times supplied to the receiver and to the space within the cylinder beneath the piston 170, and this steam will cause the piston to move upwardly, so soon as the pipe 210 is connected to exhaust, the steam above the piston exhausting through the passage 224 the pipe 212 and the pipe 210.

As stated above both the disc member 88, of the fuel feeding mechanism, and the turret 151 of the main poking mechanism are, each, provided with teeth, the teeth on each member being positioned to cooperate with a pawl, carried by a pivoted rocker arm 300. The pawl 157 carried upon one end of the rocker arm is adapted to cooperate with the teeth upon the turret of the poker mechanism, while the pawl 91 upon the other end of the pivoted arm, is adapted to cooperate with the teeth upon the measuring disc of the fuel feeding mechanism. This rocker arm is mounted upon a suitable standard or support which is rigidly secured to the top of the producer, and actuated by means of the steam engine 78, which is so positioned upon the top of the producer that the piston rod thereof, or an extension thereof, is operatively connected to one end of the member 303 the other end of which is pivotally connected to the rocker arm 300, the construction being such that upon operation of the engine, with reciprocation of the piston and the piston rod connected thereto, the rocker arm 300 will be oscillated about its pivotal point, movement of the piston rod of the engine in one direction causing the pawl 157 to engage with the teeth on the poker mechanism to cause rotation of the turret, while reciprocation of the piston rod in the other direction will cause the pawl 91 to engage with the teeth on the measuring disc of the fuel feeding mechanism to cause rotation of that disc. A spring 304 is connected, at its opposite ends, to the pawls 157 and 91, to urge each of those pawls into contact with its cooperating teeth; and the mounting of the pawls is such that both the poker, turret and fuel feed will not be actuated at the same time.

The engine 78 comprises a base member 310, which is attached to the top 50 of the producer in any suitable manner. Mounted upon the base member 310 is a steam cylinder 315, the opposite ends of which are suitably closed by means of removable heads 316, each of which is provided with an opening, having a suitable stuffing box 317 therein, through which the piston rod 318 passes, a piston 319 being mounted upon this rod and adapted for reciprocating motion within the cylinder. Also rigidly secured to the base member 310 is a second cylinder 325 which is substantially identical in construction with the cylinder 315, except that it is provided with a cooling jacket 326, the cylinder 325 being arranged coaxially with the cylinder 315, so that the piston rod 318 also extends through the openings in the removable heads 327, which openings, and the cooperating stuffing boxes associated therewith, are designated generally by the numeral 328, a corresponding piston 329, similar to the piston 319, being mounted upon this extension of the piston rod and adapted to reciprocate within the cylinder 325. One end of the piston rod 318 is adapted for connection to the above described member 303, this end of the piston rod having a member 330 threadedly engaged thereupon and adapted to form a tongue for positioning between the corresponding lips of the grooved end of the member 303, the member 330, and the said corresponding lips being provided with passages adapted to register to receive a suitable bolt or pin for holding the members in operative connection. The other end of the rod 318 is cut away as shown at 335 to form a tongue construction which is adapted to be positioned within the corresponding groove within the one end of the link member 336 the other end of which is pivotally connected to the longer arm of the bell crank lever 337. This lever 337 is pivotally mounted upon a standard 338, which is in turn bolted to the top 50 of the producer. The shorter arm of the bell crank lever 337 has pivotally connected thereto a pawl 339 which is adapted to oscillate about a horizontally arranged pivot, the free end of this pawl being so positioned as to cooperate with teeth 340 carried by the track member 107. As the piston 319, and the piston rod 318 attached thereto, reciprocates it rocks the bell crank lever 337 about its pivot causing the pawl 339, upon reciprocation of the piston in one direction, to engage with the teeth 340 and rotate the top of the producer, and the parts carried thereby, relative to the stationary shell of the producer and upon reciprocation of the piston in the other direction causes the pawl to ride freely over the teeth 340 preparatory to again advancing the top.

The engine 78, is adapted to operate upon pressure steam supplied from the same source as supplies the pressure steam for operating the main poking mechanism and the auxiliary poking mechanism. This pressure steam, which is introduced through the pipe 39, passes downwardly through the pipe 43 into the chamber 56 whence it passes through the port 65, and the cooperating inlet port 350, to the upper chamber 351 within the master valve which controls the supply of steam to the several pokers. This part of the apparatus which is designated by the term "master valve" in reality comprises a casing or housing having a plurality of valves and control passages therein, but, as stated above, for convenience of description herein, and in practice, this particular portion of the mechanism has been given this designating name. Positioned within the master valve are two passages 352 and 353, the transverse partition 354 which defines the chamber 351 being provided with two passages 355 and 356, the former of which is controlled by a valve 357 and later by a valve 358 each of these valves having a spring 359 associated therewith which tends to normally urge the valve upon its seat to close connection between the chamber 351 and the passages 352 and 353. Spaced a short distance from the partition 354 is a second transverse partition 360, which is provided with suitable ports 361 and 362 therein, the space thus separated at the upper end of the passages 352 and 353 being for convenience designated by the numerals 363 and 364. Extending from the lower face of the valves 357 and 358 are extensions or projections 365 and 366, the lower end of the extension 365 being slidably mounted within a corresponding hollow extension or guide member in a socket 382, in the upper end of the slidable piston 367 while the extension 366 is correspondingly arranged with respect to the upper end of the slidable piston 368, the two pistons being positioned respectively within the passages 352 and 353. The upper end of each of the pistons 367 and 368 is so constructed that it is adapted to function as a valve to close the respective port 361 and 362 cooperating therewith, the relative adjustment of the slidable pistons 367 and 368 upon the extensions 365 and 366 being such that as either of the pistons moves upwardly to close its cooperating port 361—362, it will first close such port and will then, upon continued upward movement, and acting through the corresponding extension 365—366, move the corresponding valve 357—358 to open the port controlled thereby. Leading off from the space 363 is a pipe 210, which is connected to the main poking mechanism, this pipe serving when the port 355 is open and the port 361 is closed to supply pressure steam to the main poker cylinder for causing downward reciprocation of the poker, and when the port 355 is closed and the port 361 is open, to permit the exhaust of steam from the poking mechanism, with concomitant upward reciprocation of the poker, each of the passages 352 and 353 into which the ports 361 and 362 open being always connected at its upper end, and below the partition 360, to the passage 371, which is in turn connected to the port 66, within the fitting 44, this port leading into the space 67 to which the pipe 48 is connected, this pipe being in turn connected, as described above, to the exhaust pipe 53. Leading off from the space 364 is a pipe 372, which is connected to the auxiliary poking mechanism and corresponds in function with the pipe 210, the valves 358 and 368 acting to cause the flow of pressure steam through that pipe to the auxiliary poker or to permit the exhaust of steam from that poker through the pipe 53.

The pistons 367 and 368, as stated above, are slidably mounted within the passages 352 and 353 and each of these passages is provided with an inlet port, the port cooperating with the passage 352 being designated by the numeral 375, while the port cooperating with the passage 353 is designated by the numeral 376. These ports have attached thereto pipes 377 and 378 respectively, through which pressure fluid is supplied beneath the slidable pistons, at suitable intervals, to raise those pistons, and thus in turn raise the corresponding valves 357 and 358 cooperating therewith. The piston valves 367 and 368 are preferably cut away intermediate their ends to provide a space into which leakage between the pistons and the walls of the passages 352 and 353 may flow to escape through the passage 379 into the drain pipe 380. Each of the slidable pistons 367—368 is preferably provided with a passage 381 for permitting escape of any liquid that may collect in the sockets 382. Also the upper enlargement of each of these piston valves is provided with drain ports 383 through which condensation within the spaces 363—364, or within the upper ends of the passages 352—353 may escape to the drain 380.

Attached to the master valve, as shown generally in Fig. 10 and more particularly in Figs. 12, 13, 14 and 15 is a second or interlock valve housing, which is provided with two parallel passages 390 and 391, each of these passages being at all times connected to each other by means of the port 392, the space 393 and the port 394. The passage 390 is connected, through the port 395 to the space 351, the passage 391 being thus also connected to this space through the passages 392, 394 and the space 393. Each of the passages 390 and 391 is also connected to one of the spaces 363 and 364. Fig. 13, being a view in a plane passing through the passage 390 shows the arrangement of the passage 395, which connects the passage 391 to the space 351. The passage 390, as shown, is likewise connected to the space 363 by means of the passage 396. The passage 391, as stated above, is not directly connected to the space 351; but is directly connected to the space 364 by means of a port 397, corresponding to the port 396 of the passage 390. The passage 390 is connected at its upper end, by means of a suitable port to the pipe 245, the other end of which is connected, as described above to the passage 249 within the main poker mechanism. The passage 391 is connected at its extreme upper end through a similarly arranged port to a pipe 400, which is in turn connected to the passage within the auxiliary poker mechanism corresponding to the passage 249. Opening into the passage 391 at a lower level than the port connected to the pipe 400, is a port 401 to which is connected the pipe 402 which leads to the pilot valve of the engine 78, which pilot valve in turn controls the positioning of the distributor valve of that engine. Leading off from the passage 391, intermediate the port connected to the pipe 400, and the port 401, to which is connected the pipe 402 which leads to the pilot valve of the engine 78, is an exhaust port which is connected by means of a suitable pipe 403, to the space 67 within the fitting 44. If preferred this pipe 403 may exhaust into the atmosphere to act as a telltale. Leading off from the passage 390, intermediate the passage 392 and the port connected to the pipe 245 is a passage 404, to which is connected the exhaust pipe 405, similar to the pipe 403, and which also opens into the space 67 or to the atmosphere. If desired the pipes 403 and 405, may both be connected to the space 67 through a single pipe.

Slidably mounted within the passage 390 is a piston valve which consists of a stem 410, having the enlargements 411 and 412 upon the opposite ends thereof, the length of the stem and the positioning of the enlargements, being such that when in one position the passage 395 is closed and the passage 392 is connected to the port 404, and through that port to the exhaust pipe 405, and when in another position the passage 404 is closed and the passage 392 is connected through the passage 395 to the space 351, and thus to pressure steam. The upper end of each of the passages 390—391 is provided with a closure member 413, having the stop member 414 threadedly mounted therein, the lower end of the stop member being adapted to serve to limit the upward movement of the piston valve under the action of the spring 415, which is positioned within the lower closure member 416, and which is so arranged that it tends to urge the piston valve into uppermost position. The closure member 416 is provided with a member 417 threadedly mounted therein, for varying the tension of the spring as desired.

The passage 391 is also provided with a piston valve, 418 identical in construction with the piston valve shown in Fig. 13 as being positioned within the passage 390, and so arranged within that passage that when in lowered position the passage 394 is connected to the pipe 402, and when in upper position the passage 403 is connected to the pipe 402.

The pipe 245, which opens into the upper end of the passage 390, above the uppermost position of the piston valve in that passage, is connected at its other end, as shown particularly in Fig. 8 to the passage 249, of the poker cylinder, and is thus subjected to the pressure within the receiver 260, during such time as the piston 170 is in elevated position. The pipe 400, which opens into the upper end of the passage 391 above the uppermost position of the piston valve in that passage is correspondingly connected to the steam pressure within the receiver of the auxiliary poker 76. The tension of the springs 415, is such that the receiver pressure is sufficient to hold each of the piston valves within the passages 390 and 391 in lowered position, so that pressure steam from the chamber 351 may pass from that chamber through various passages and ports of the interlock and the pipe 402 to the pilot valve of the turning engine. During the downward stroke of the poker piston these valves are still held in lowered position, being subjected to pressure steam admitted through the pipe 210, while the turning engine continues its stroke, the stroke which causes turning of the rotatable measuring disc of the fuel feeding device. But as soon as the master valve is actuated to connect the pipe 210 to the exhaust, the interior of the cylinder above the piston 170 is also connected to the exhaust, and the pressure above the interlock piston valve being then relieved the spring 415 urges that valve into uppermost position, thus connecting the pilot valve of the turning engine to exhaust and preventing access of fresh steam to the engine to cause reciprocation on its reverse stroke until this positioning of the interlock valve is changed. And the control mechanism is so arranged that this will occur so soon as the poker piston, upon the upward stroke, passes the passage 249 and thus again connects the pipe 245 to receiver pressure, the master valve having meanwhile assumed such position that this receiver is connected to pressure steam instead of exhaust.

Figure 4:
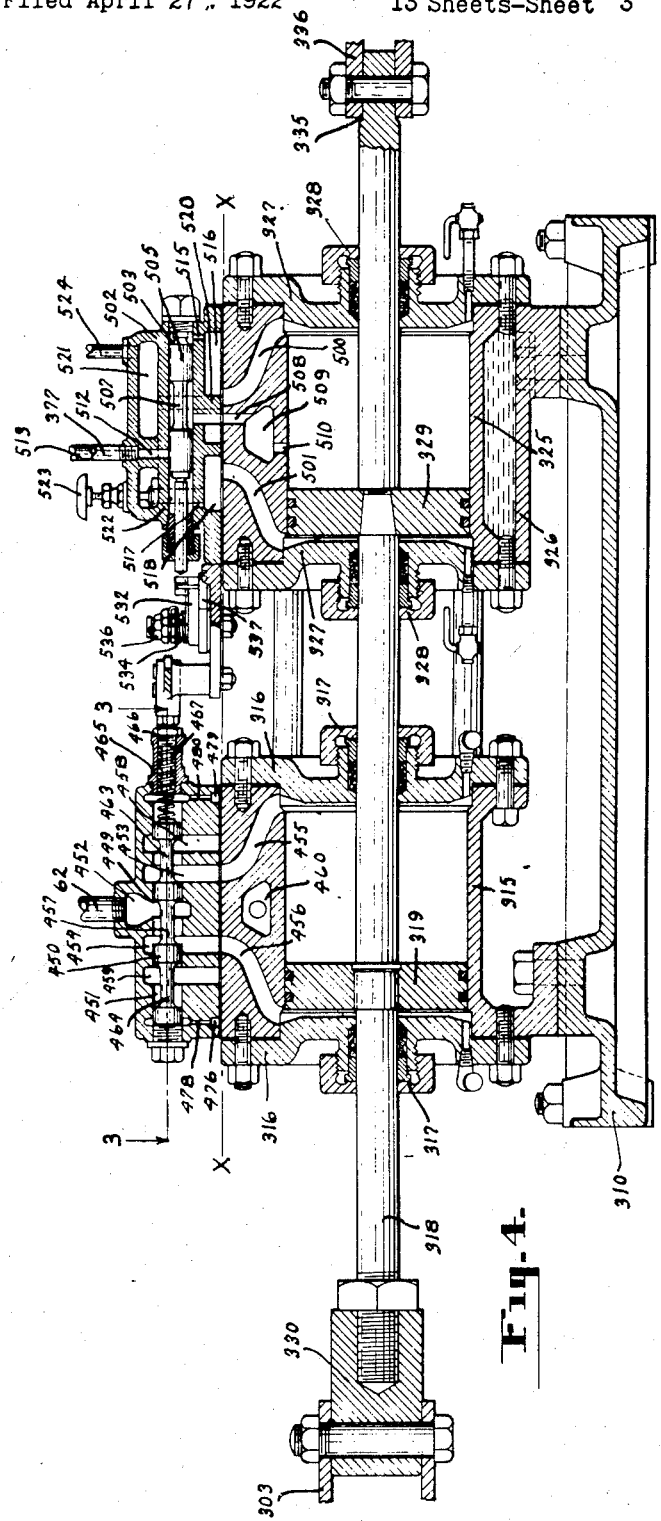
Fig. 4 is a sectional view through the operating mechanism shown in Fig. 3; the lower part of the view, that part below the line $x$—$x$, being a section along the line 4—4 of Fig. 3; while that part above the line $x$—$x$ is a section along the line $4^a$—$4^a$ of Fig. 3.

As stated above an operating engine or motor, designated generally by the numeral 78, is provided for rotating the top of the producer, and for also operating the fuel feeding mechanism, and rotating the turret carrying the main poker. The engine shown is designed to operate upon steam, although an engine adapted to operate upon other pressure fluid may be used if desired. Or some other form of motive power may be used. For the purpose of more clearly illustrating the construction of this engine, and of that part of the control mechanism associated therewith, the sectional view, shown in Fig. 4 is taken along two distinct planes. As set out in the brief description of the figures, the lower part of this mechanism, that part below the line $x$—$x$ is taken along the line 4—4, or rather within a vertical plane passing through the line 4—4, and therefore, passing through the longitudinal axis of the cylinder, while the upper part, that part of the mechanism which lies above the line $x$—$x$ and which comprises the steam chest, valve mechanism, and the like, is illustrated by a section taken along the line 4ª—4ª, so that the section passes through the axis of the control valve of the steam cylinder, and also through the axis of one of the control valves forming a part of the control mechanism associated with that steam cylinder.

This engine, is provided with a steam chest designated generally by the numeral 449, which carries therein a suitable distributing valve, designated generally by the numeral 450, which valve is reciprocably mounted within the passage 451, and controls admission of pressure steam to the cylinder, upon opposite sides of the piston, to cause reciprocation of that piston. This passage 451 is provided, substantially midway its ends, with a groove or passage 452 into which opens the pipe 62 through which pressure steam for operating the turning engine is introduced from the space 56 within the fitting 44. Spaced substantially equal distances from the groove 452 are two grooves 453 and 454, each of which is connected, by means of a suitable passage to one end of the cylinder 315, as shown, the groove 453 being connected to the passage 455 and the groove 454 to the passage 456 The piston valve is cut away as shown at 457, the cut away portion being of just sufficient length to connect the groove 452 with either of the grooves 453 and 454, but to at no time connect both the grooves 453 and 454 to the groove 452 or to connect those two grooves to each other. Connected to the passage 451, and positioned between the groove 453, and the end of the passage is a groove 458, while positioned between the groove 454, and the adjacent end of the passage 451 is a corresponding groove 459. Each of the grooves 458 and 459 is connected to a passage 462 which in turn opens into a suitable passage 460 within the cylinder casting, which passage has connected thereto the pipe 461, the opposite ends of which opens into the space 67 of the fitting 44, and is thus connected to the exhaust pipe 53. The piston valve 450 is provided at one end with a cut away portion 463, so proportioned that in one position of the valve the groove 453 will be connected to the groove 458 to thus connect the end of the cylinder to which the groove 453 is connected by means of the passage 455 to exhaust, while in another position of the valve the two grooves 453 and 458 are disconnected. The other end of the valve is also provided with a cut away portion 464 which is so proportioned that the grooves 454 and 459 may be connected to each other to thus connect the end of the cylinder with which the passage 456 cooperates to the exhaust and in another position to disconnect these two grooves 454 and 459 and thus disconnect the corresponding end of the cylinder from the exhaust. The passage 451 is provided at one end with a hollow plug or closure 465, which is threadedly engaged within the end of the passage. The passage in the plug 465 is also threaded to receive a threaded member 466, against which one end of the spring 467 bears, the spring being supported within the passage in the plug 465, the other end bearing against the corresponding end of the piston valve 450. The member 466 may be moved in or out to vary the tension of the spring as desired. The steam chest is also provided with a second passage 470, which is parallel to the passage 451 and which has slidably mounted therein a pilot valve designated generally by the numeral 471. This valve consists of a piston valve provided with two enlargements 472 and 473, which fit snugly within the passage 470, the intermediate part of the valve being cut away. The enlargements 472 and 473 are so positioned relative to each other that the cut away portion of the valve, between these enlargements, is at all times in register with the pipe 402, of the interlock valve, through which pressure steam is provided for moving the piston valve 450. The passage 470 is provided with two ports 474 and 475, spaced substantially equal distances from the end of pipe 402 which opens into the passage 470, the spacing of these ports and the construction of the valve 471 being such that either port may be connected to the pipe 402 but both ports may not be connected to that pipe at the same time or connected to each other at the same time. The port 474 is connected to a passage 476, the opposite end of which opens into the passage 478, which in turn is connected to the end of the passage 451. The port 475 is connected to the passage 479, the other end of which opens into the passage 480, and is thus in turn connected to the opposite end of the passage 451. Opening into the passage 470, and positioned intermediate the port 474 and adjacent the end of this passage is a port 481, which is connected to the exhaust passage 460. Positioned between the port 475 and the adjacent end of the passage 470 is a port 482, which is also connected to the exhaust passage 460. When the pilot valve 471 is in one position, as shown in the drawing, the pipe 402 is connected through the port 475 and passage 479 to the groove 480, within the passage 451. At the same time the opposite end of the passage 451, between the end of the piston valve and the end of the passage is connected, through the passage 476, the port 474, and the port 481 to the passage connecting that port to the exhaust 460, so that pressure steam is thus introduced to the right hand end of the passage 451, while the opposite end is connected to the exhaust. Under such circumstances the piston valve 450 moves to the left to connect the passage 452, through the passage 456, to the left hand end of the cylinder 315, to thus admit pressure steam to that cylinder and cause the piston to travel toward the right. When the pilot valve is moved to the other extreme, the right hand end of the passage 451 is then connected to exhaust while the left hand end is connected to pressure steam and under such circumstances the piston valve is moved to the right to connect the right hand end of the cylinder 315 to pressure steam, and the left hand end to the exhaust, thus moving the piston 319 to the left.

The cylinder 325 is provided with passages 500 and 501 each of which is connected to one end of the cylinder. This cylinder is also provided with a valve chest, designated generally by the numeral 502, which is provided with two parallel passages, 503 and 504. In each of these passages is mounted a slidable piston valve, the passage 503 having the valve 505 therein and the passage 504 the valve 506 therein. Each of these valves is provided with a cut away portion 507. The passage 503 has connected thereto, at substantially midway its length, the passage 508, which opens into the passage 509, located within the cylinder, which is in turn connected to the cylinder by means of the passage 510. The passage 504 is provided with a corresponding passage 511, which is connected to the passage 509, and thus to the interior of the cylinder through the passage 510. The passage 503 is also connected to a passage 512, to which is connected the pipe 377, which opens into the lower end of the passage 352 of the master valve. The cut away portion 507 of the valve 505 is so proportioned that when the valve is positioned, as shown in the drawing, at the extreme right of the passage 503 the passages 508 and 512 are disconnected, but when this valve is positioned at the extreme left these two passages are connected to each other. Passage 504 also has connected thereto a passage corresponding to the passage 512 to which is in turn connected a pipe 513, the other end of which opens into the bottom of the passage 353 of the master valve. The construction of the valve 504 is also such that when in extreme right hand position the passage 511 is disconnected from the pipe 513, but when in extreme left hand position these two are connected. The passage 503 is also provided, at its extreme right end with a passage 515, which opens into the cut away space 516, within the base of the valve chest 502, and is thus connected to the passage 500. A passage 517 is also connected to the extreme left hand end of the passage 503 this passage 516 opening into the space 518 within the base of the valve chest, which is in turn connected through the passage 501 to the interior of the cylinder. Corresponding passages connect the opposite ends of the passage 504 to the spaces 516 and 518. The space 516 is connected by means of the passage 520, shown in dotted lines in Fig. 4 to the chamber 521, which chamber is also connected, through the passage 522, also shown in dotted lines in Fig. 4 to the space 518 a suitable valve 523 being provided for controlling the effective opening through passage 522. By varying the setting of this valve the rate at which fluid may flow from one end of the cylinder to the other is varied and thus the speed of operation of the turning engine controlled. Preferably the fluid within the cylinder 325, and cooperating passages is a liquid such as oil, but any other suitable fluid may be used. The space 521 has connected thereto a pipe 524, which may be in turn connected to any suitable source of supply of oil, for replenishing losses of oil within this part of the mechanism due to leakage and the like.

As shown in Fig. 4 with the piston 319 at the extreme left end of the cylinder 315, both pokers are in elevated position, the valve mechanism being so set that a down stroke of the main poker is just about to begin, concomitantly with movement of the piston on the right hand stroke, which movement causes turning of the disc member of the fuel feeding mechanism. As shown the valve 450 is held in such position that pressure steam is being admitted to the left hand end of the cylinder. As the piston 319 moves to the right, under the influence of this pressure steam, the piston 329 is also carried to the right. When the device is assembled ready for operation, the cylinder 325, the passages in the cylinder, and the passages in the valve chest are filled with oil, of any suitable character, such for instance as a good grade of lubricating oil. As the piston moves to the right the oil in the cylinder is forced under pressure, during this motion of the piston 329, through the passages 500, 516, 515, and the corresponding passages connecting to the passage 504, with resulting movement of the valve members 505 and 506 to the left. With the apparatus occupying the positioning shown in Figs. 3 and 4 this will cause movement of the valve member 505 to admit pressure oil from the cylinder 325 through the passages 510, 509, 508, and so on out through the pipe 377 into the lower end of the passage 352 in the master valve to cause upward movement of the piston 367. As this piston travels upwardly it first closes the port 361 thus disconnecting the passage 224 from the exhaust. Further upward movement of the piston 367 causes the valve 357 to open and admits pressure steam to the passage 224 to cause the piston 170 to move downwardly and drive the poker into the fuel bed. At the same time oil is being forced through the passage 500, the space 508, the passage 520, the space 521, the passage 522, the space 518 and the passage 501 back into the other end of the cylinder 325, but because of the setting of valve 523 this flow of oil is comparatively slow, the rate of flow being subject to ready control by proper positioning of the valve 523. By means of this construction the rate of travel of the piston 319, is controlled so that the operating mechanism can be caused to function at any desired rate. As the piston 329 continues its movement to the right it overruns the port 510 which is then immediately subjected to suction rather than to pressure. Therefore, there is a tendency to withdraw the oil within the passage 510 and the cooperating passages connecting it to the master valve from those passages. Consequently the piston valve 367 will be caused to move downwardly, thus allowing the valve 357, acting under the pressure of the spring 359 to also move downwardly to close the port 355 and disconnect the passage 224 from pressure steam and, upon continued movement of the piston valve, to connect that passage to the exhaust. As a result the poker will move upwardly out of the fire. At the same time the space within the left hand end of the passage 451 will be connected to the exhaust through the interlock valve, cooperating with the main poker. Consequently movement of the valve 450 to the right, to connect the right hand end of the cylinder to pressure steam, with consequent forcing of the piston back to the left is absolutely prevented until such time as the piston within the poker mechanism travels back to the top of the cylinder and thus connects the upper end of the interlock valve to the pressure steam within the receiver of the poker, to force the interlock valve downwardly, so that pressure steam will be admitted to the left hand end of the passage 451 to thus force the piston valve against the spring 467, to the right to cause reciprocation of the piston 319 to the left.

During operation of the device the two pokers are intended to operate in alternation, and to not both poke at the same time. In order to accomplish this the two valves 505 and 506, which control the flow of oil from the cylinder 325, to the two cooperating piston valves 367 and 368, with the corresponding parts in the master valve, are provided. The pilot valve 471 is positively operated by means of suitable link mechanism, which comprises a link 525 which is pivotally mounted upon a stationary part of the apparatus, one end of this link being connected to the operating stem of the piston valve, and the other end to one end of the slidable rod 526. The other end of the rod 526 is slidably engaged within an extension 527 connected to the piston rod 318, and is provided with spaced stops 528, the construction being such that as the piston rod moves to the left the extension or abutment 527 carried thereby will engage one of the stops and move the rod 526 to cause the pilot valve to be moved to the right, and vice versa. Also pivotally mounted upon a fixed part of the casing, and adjacent the ends of the valves 505 and 506, which extend through the wall of the chest 502, and terminate outside this chest, is a member 530, which is provided with opposite extensions, to each of which extensions is pivotally connected a finger adapted to cooperate with one of the valves 505, 506. The finger cooperating with the valve 506 is designated by the numeral 531 and that cooperating with the valve 505 by the numeral 532. Each of these fingers is provided at its free end with a socket like groove or depression 533, which is adapted to receive the free end of its cooperating valve 505 and 506. These fingers 531 may be easily swung about their pivots but each of them is provided with a spring 534, which is connected at one end to its cooperative pivot 535, 536 upon which the fingers 531 and 532 are respectively mounted, and at its other end is connected to the free end of the cooperating finger the construction being such that the spring normally tends to swing the finger into a definite angular relationship with the member 530, upon which it is mounted, this relationship being a positioning at substantially right angles to the line connecting the two pivots 535 and 536. The member 530 is also provided with an extension or stop 537 which is adapted to cooperate with corresponding fixed stop members 538 to limit movement of that member as it oscillates about its pivot.

Figure 20A:
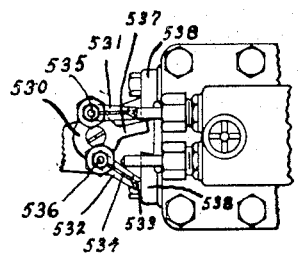
Figure 20B:
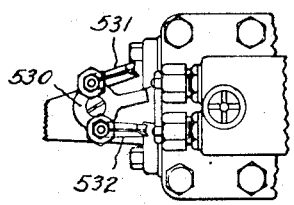
Figure 20C:
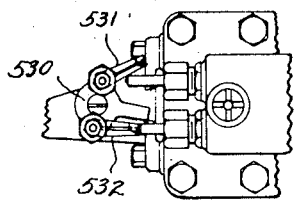
Figure 3:
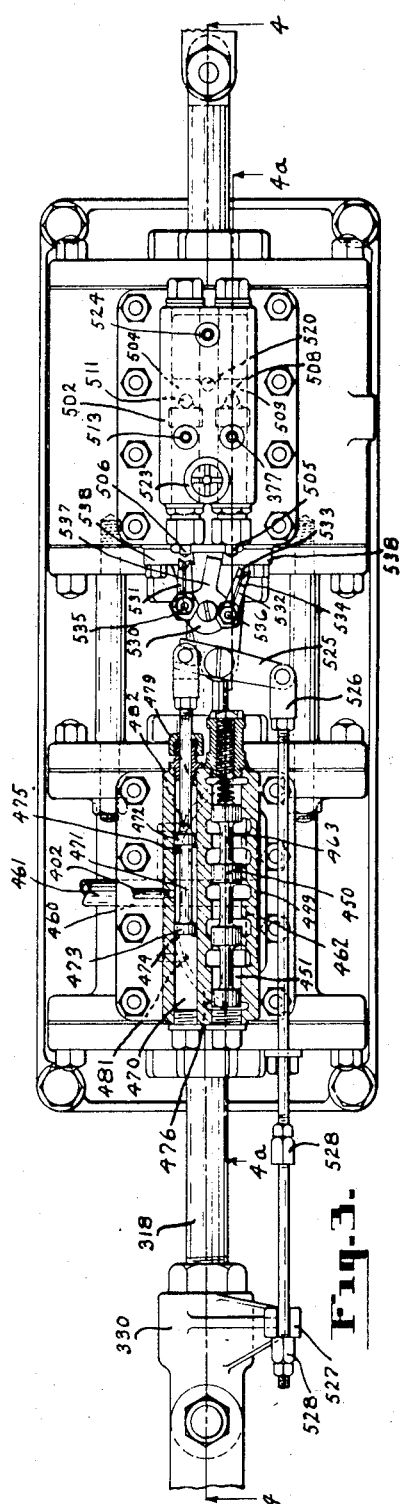
Fig. 3 is a plan view of the driving mechanism, certain parts thereof being shown in section, the section through these parts being along the line 3—3 of Fig. 4 looking in the direction of the arrows.

As shown in Fig. 3 each of the valves 505 and 506 is positioned at the extreme right hand end of its passage. At this time the member 530 is so positioned, with the extension 537 contacting with one of the cooperating stops 538, that the finger 531 is substantially in alignment with the valve 506, while the finger 532 is so positioned that its free end is swung outside the cooperating end of the valve 505. As the piston 329 moves to the right, oil will be forced under pressure into the right hand end of each of the passages 503 and 504, thus moving both valves toward the left. The valve 505, being entirely unrestrained, will immediately move to the extreme left hand end of its passage; but the valve 506 is not thus entirely unrestrained, and cannot move to the extreme left hand end of its passage. For as this valve 506 moves towards the left the free end thereof will move into the cooperating socket or pocket in the end of the finger 531, and as it moves, will rotate the member 530, about its pivot, the rotation continuing until the extension 537 contacts with the right hand stop 538, thus preventing further movement of the valve 506. At the same time the finger 532 will also be swung about its pivot, since as stated above each of these fingers has a normal and predetermined positioning relative to the member 530 upon which they are mounted, and will be brought into contact with the free end of the valve 505. Since the fingers may be readily swung about their pivots, the finger 532, at this time, will be swung aside from its normal position. When the valves are in this position, the valve 505 having moved to the extreme left of its passage will have assumed such a position that the passage 508 is in open communication with the passage 512 and oil under pressure will therefore be forced upwardly into the lower end of the passage 352 of the master valve, to actuate that valve and cause reciprocation of the main poker associated therewith. The positioning of the members 530, 531, 532, and the cooperating ends of the valves 505 and 506, at this stage of the operations, is shown in Fig. 20ª.

As the piston 329 continues its movement and overruns the port 510 the master valve will be connected to the suction side of the piston instead of the pressure side, as set out above, and consequently the supply of pressure steam to the main poker will be cut off and the cylinder of that poking mechanism connected to the exhaust. However, the right hand end of each of the passages 503 and 504 will still be connected to the pressure side of the piston 329 and therefore the two valves 505 and 506 will be maintained in the same position until the piston reaches the end of its right hand stroke. When the piston 329 starts upon its return, or left hand stroke, the right hand ends of the passages 503 and 504 will then be connected to the suction side of the piston while the left hand ends will be connected to the pressure side and the valves 505 and 506 will then be forced to the extreme right hand position, at which time both passages 352 and 353 of the master valve will be disconnected from the cylinder 325, and will, therefore, receive no pressure oil tending to actuate this part of the mechanism. This is the part of the stroke during which the top of the producer, and the turret of the main poking mechanism, are actuated, for when the parts are thus positioned it is impossible for pressure steam to flow to either of the poking mechanisms, and consequently neither of these pokers can be forced into the fuel bed while the top is turning.

When the two valves 505 and 506 are forced to the right, as described above, upon the left hand stroke of the piston 329, the member 530, and the fingers 531 and 532 will remain in the position they were forced into when these two valves were forced to the left hand end of their passages. This positioning of the valves and of the members 530, 531 and 532, is clearly shown in Fig. 20^b. At this time the finger 532 is so positioned that it is in substantial alignment with the stem of the valve 505 while the finger 531 is so positioned that it is out of alignment, and to the outside of, the free end of the valve 506; this being just the reverse position from that shown in Fig. 3.

As the piston 329 moves to the right on the next stroke, the two valves 505 and 506 will be again forced toward the left, but on this stroke the valve 506 will be permitted to move, unrestrained, to the extreme left hand position within its passage, while the valve 505 will contact with the cooperating end of the finger 532 and be brought to a stop in such position that pressure oil will not be admitted to that passage of the master valve cooperating with this particular valve. At this time the passage 353, of the master valve, which is associated with the auxiliary poking mechanism, will however be connected to the pressure oil and functioning of the auxiliary poking mechanism will consequently ensue. At this stage of the operations the members 530, 531, 532 and the ends of the valves 505 and 506 occupy the positions shown in Fig. 20^c.

By means of this construction the pokers are caused to function alternately, the main poker, for example, operating during one right hand stroke of the piston 329, while the auxiliary poker operates on the next right hand stroke of the piston 329. And, of course, neither poker can operate during a left hand stroke of the piston 329.

Because of the construction of that part of the apparatus which contains the interlock valves, it is impossible for the turning engine to operate so long as either poker is in lowered position. For so long as the passage 249 of the main poker mechanism is connected to the exhaust, which is true when the poker is in lowered position and the piston 329 is moved past the port 510, or the corresponding passage of the auxiliary poking mechanism is similarly connected to the exhaust, pressure steam will not flow through the pilot valve to actuate the control valve of the engine to permit the flow of pressure steam to the engine cylinder to cause reciprocation of the piston. As is obvious from the construction shown in Figs. 12 and 13 it is necessary that both the interlock valves be in lowered position in order that steam may pass from the chamber 351 to the pipe 402 and thence to the pilot valve of the engine. Therefore, with either poker in lowered position one of the interlock valves will be in raised position to cut off connection between the pilot valve and pressure steam. It is to be distinctly borne in mind, that while the interlock valves control the supply of pressure steam, through the pilot valve, to the passage 451, and thus control the positioning of the valve within that passage, they do not in any way directly control the flow of pressure steam to the cylinder 315. Therefore, after the valve 457 has once assumed a definite position, under the influence of the steam admitted to the passage 451 by the pilot valve, it will remain in that position until such time as further pressure steam is admitted to the passage to move this valve into a different position. And so although the interlock valve, cooperating with each of the pokers, may open a considerable time before the piston 319 completes its working stroke in the turning of the fuel feed mechanism, nevertheless the cylinder 315 remains connected to pressure steam so that this piston is forced to complete its stroke. But return stroke of the piston 319 is prevented until such time as the position of the interlock valve is varied to permit the introduction of pressure steam into the passage 451 to move the valve 457 to permit the flow of pressure steam to the cylinder 315 to accomplish this return stroke of the piston.

The auxiliary poker which is shown in Fig. 9 is substantially identical in construction, and operation with the main poker shown in Fig. 7, 7^a and 8 except that it is not mounted upon a rotatable water cooled turret but is permanently positioned. The main poker which is mounted upon a rotatable turret, positioned eccentrically to the rotatable top of the producer, and which is also inclined, is, during operation, and as a result of this inclination, and the rotation of the turret and of the top, caused to agitate uniformly substantially the entire fuel bed. Under actual operating conditions this poker will during the course of one complete rotation of the top of the producer pass through, at least once, substantially every square foot of the surface of the fuel bed. However, because of the inclination of this poker and as shown most clearly in Fig. 1, it is not adapted to agitate the entire fuel bed and to also agitate completely the layer of fuel lying immediately adjacent the lining of the producer. By positioning the auxiliary poker so that it is adjacent the lining of the producer, and holding it in stationary position with respect to the top, it is caused to poke only the zone of fuel lying immediately adjacent the lining. As a result it tends to break off any clinkers which may cling to the lining, and in addition by properly agitating and compacting the fuel within the zone adjacent the lining tends to prevent the formation of channels or chimneys and the attendant wall action.

Large quantities of tar are formed during the generation of producer gas from bituminous coal, and the like. In many cases the presence of this tar in the gas, as an impurity, renders it unfit for the purpose intended. It is, therefore, the practice to remove this tar by subjecting the gas to suitable cleaning. The production of tar from the average bituminous coal may average twenty gallons, or more, of tar to the ton of coal. And when it is realized that the type of producer shown and described herein is adapted to gasify as much as two or three tons of coal an hour, and that sometimes a single plant will include as units thereof as many as a half a dozen or more of these producers, it is evident that the question of what to do with this tar is a very important one. As set out in the patent of Harry F. Smith No. 1,394,043 it is the practice to return this tar to the generating chamber of the producer and gasify it. In order to accomplish this the tar which is removed from the gas is introduced through the pipe 60, at the desired rate, into the upper end of the pipe 59. Where the tar is returned in the manner referred to, it is ordinarily so fluent that it may be readily handled being of about the consistency of lubricating oil. Sometimes, however, the tar is not so fluent, and will not readily flow. But as shown clearly in Fig. 10 the pressure steam pipe 43 and the exhaust pipe 48 both pass throughout the length of the pipe 58 and serve to heat the tar sufficiently to cause it to readily flow. The tar passes downwardly into the space 68 and thence through the pipe 69 into a storage tank 601, shown particularly in Fig. 21 which is mounted in any suitable place upon the top of the producer. Leading out of the lower part of the tank 601 is a pipe 602, having a suitable control valve 603 therein, which pipe opens into the member 604 which constitutes one member of an injector. The member 604 extends through a suitable opening in the top of the producer and terminates within the gas generating chamber of the producer, the inner end thereof consisting of a nozzle member 605 of conventional Venturi construction. Pressure steam is introduced through the pipe 606, the lower end of which terminates within the nozzle 605, the construction being such that as the steam passes through the pipe 606 tar drawn in through the pipe 602 is broken up and forced through the nozzle 605 in the form of a spray. The pipe 606 is provided with suitable swivel joints 607 to permit proper adjustment of that pipe within the member 604, to secure the desired setting of the end of the pipe relative to the opening within the nozzle 605. This movement of the pipe is accomplished by providing the pipe where it passes through the plug 608 closing the outer end of the member 604, with suitable threads adapted to cooperate with corresponding threads within the member 609 which is rotatably mounted upon the plug 608. Upon rotation of the member 609 the end of the pipe 606 will be moved relative to the nozzle 605 to give the desired setting. A valve 610 is provided in the pipe 606 to control the flow of steam to the injector.

Fig. 19 shows, diagrammatically, the arrangement of the various valves and the piping controlling the main poker, the auxiliary poker, the turning engine, and the interlock mechanism.

In Fig. 22 is shown a slightly modified type of construction for the upper end of the poker cylinder. This specific modification is, in practice, sometimes substituted in place of the type of construction shown in Figs. 7 and 7ª, and with this specific type of construction the poker mechanism will often function more satisfactorily in preventing jarring or pounding upon return stroke of the poker pistons than with the type of construction shown in Fig. 7 of the drawing. In the construction as shown in Figs. 7 and 7ª, when the poker moves upon its return stroke and the piston 204 tends to move upwardly to compress the steam within the space 205, the valve 207 immediately closes and the escape of steam from within the space 205 is entirely prevented, except for such slight leakage as may take place. Consequently the pressure rapidly builds up and as the poker reaches the upper limit of its return stroke the pressure has become so high that a cushioning effect is not secured, but the poker piston 170 is brought suddenly to rest, with an undesirable jarring to the mechanism. The construction shown in Fig. 22 is designed to obviate this difficulty. As is evident from the drawing, the simple check valve 207 is dispensed with and in place thereof a small cage is positioned within the upper end of the passage 206' which cage consists of two complementary members or sleeves 650 and 651, which are slidable with reference to each other, suitable packing 652 being introduced between the two to make a tight joint and prevent leakage around the cage. The member 650 is carried by a threaded extension 653 which extends through a suitable and correspondingly threaded member 654 which is in turn rigidly attached to the cover 201' by means of suitable bolts. Suitable manipulation of the member 653 will secure proper compression of the packing 652, to maintain a tight joint. The inner end of the member 653 where it is connected to the sleeve 650 is provided with a passage 660, the construction being such that the passages 655 which extend through the upper end of the member 650 and connect with the space within the cage are always in open connection with the cylinder 205'. The passage within the sleeve 650 is provided at one end with a valve seat, controlled by the valve 657, which is normally held to its seat by means of the spring 658. The member 651 is provided with a port 659 which opens into the passage 206'. In the operation of the poker pressure steam is normally admitted to the space 205', the steam passing through the port 659 and the passages 656 into that space. When the poker is at rest, and upon down stroke of the poker, the port 656 is closed by means of the valve 657 which is held upon its seat by the spring 658. As the poker moves on its upward or return stroke the pressure within the space 205' builds up. As this pressure builds up there is a return flow of steam from the chamber 205' through the port 655 into the receiver. And as the pressure continues to build up still further a certain pressure will be reached which is sufficient to overcome the tension of the spring 658 so that the valve 657 will be moved from its seat to give a larger effective opening from the chamber 205' into the receiver. As a consequence the piston 170 will not be brought to a sudden stop, but its upward stroke will be damped out so that undesirable jarring will be avoided.

In the preferred embodiment of the invention disclosed in the drawing, and described above, the producer is shown as having two pokers, one fixedly mounted upon the top, adjacent the periphery thereof, so that upon reciprocation, during relative rotation of the body portion of the producer and the top, the zone of fuel immediately adjacent the wall of the producer will be agitated, the other being so mounted upon the top that its positioning may be varied from time to time, the construction and mounting of this second or main poker being such that, upon reciprocation, during relative rotation of the body portion of the producer and the top, the main portion of the fuel bed will be agitated. Of course, if desired, one of these pokers could be dispensed with, if it is found that one poker is capable of satisfactorily agitating the fuel bed. And in smaller size producers, those having say, a diameter of nine feet or less, it is the general practice to use only one poker. But in producers ranging in size from nine feet up to say sixteen to eighteen feet it is the usual practice to employ two pokers, as illustrated. Also, of course, more than two pokers may be employed if that seems desirable. Where only one poker is employed the double valve mechanism associated with the cylinder 325 may be dispensed with and a single valve mechanism substituted in place thereof; and also one of the two valve members of the master valve and one of the members of the interlock valve may be omitted. But where more than two pokers are to be utilized of course it would be necessary to have a corresponding number of valve members in the master valve and in the interlock valve; and a suitable modification of the valve mechanism for controlling the passages connecting the cylinder 325 to the various valve members of the master valve should be made.

Furthermore it may prove desirable to use more than one nozzle 605 for returning tar to the generating chamber. As set out in the patent to Harry F. Smith No. 1,394,043 dated October 18, 1921, the tar returned to the generating chamber of the producer should be so divided that there will not be a sufficient quantity of tar introduced upon any particular part of the fuel bed to unduly quench or cool off that part of the fuel bed. In order to secure the desired distribution of the tar to avoid this undesirable condition it may be more satisfactory to employ two spray nozzles, or even more. In the referred to patent a considerable number of small pipes or nozzles for introducing the tar in fine streams is shown; but the number of nozzles is unimportant, the desirable feature being that the tar shall be so distributed as to not unduly quench the fuel bed, with resultant chilling of portions of the fuel bed.

The producer described above will, in practice, maintain the fuel bed in uniformly satisfactory gas making condition, the introduction of fresh fuel to the fuel bed, the agitation of the fuel bed to maintain it of substantially uniform resistance to draft therethrough, the return of tar, and like steps, being all mechanically and automatically performed. There will be times, however, because of peculiar coal characteristics, or something of that character, when lack of uniformity will develop in the fuel bed. It may be, for example, that, despite the operation of this device, a channel or chimney will burn through the fuel bed. If this should occur it would be desirable to concentrate the poking upon that particular section of the fuel bed, in order to compact the fuel bed there, and it might perhaps be desirable to concentrate the feeding of fuel upon that section of the fuel bed in order to build it up. Either of these things can be readily accomplished. By swinging the pawl 339 out of contact with the teeth 340, the top may be held stationary, with reference to the body portion of the producer, while the rest of the mechanism functions. While the top is thus relatively stationary if it is desired to operate the fuel feed, to concentrate the feeding of fuel upon a specific portion of the fuel bed, the continued functioning of the turning engine would accomplish this desired result. Or if it is desired to cause continued agitation of a particular section of the fuel bed, the pawl 157, cooperating with the turret of the main poker, may be held out of engagement with the teeth on that turret and consequently the main poker would thus agitate only a certain prescribed portion of the fuel bed. As shown, particularly in Fig. 17, a latch member 301 is carried by the member 300, which is so constructed that it may be swung into cooperative relation with the pin or lug 302 carried by the pawl 157, to latch that pawl in such position that it cannot contact with the teeth on the member 156.

During regular operation of the device the speed of operation of the turning engine may be readily controlled by properly positioning the valve 523, and obviously the rate of fuel feed and of reciprocation of the two pokers will be at the same time correspondingly controlled. Further the rate of feed of the fuel may be additionally controlled by effecting desired setting of the plate 120, which will cause the pawl 91 to advance the measuring disc, of the fuel feeding mechanism, one, two or more teeth, at a time as desired.

While the forms of apparatus herein described constitute preferred embodiments of the invention, it is to be understood that the invention is not limited to these precise forms of apparatus, and that changes may be made in either without departing from the scope of the invention which is defined in the appended claims.

What is claimed is:

1. A gas producer comprising in combination, a body portion, adapted to contain a fuel bed, a top therefore; means for rotating said body portion and top relative to each other; a plurality of pokers carried by said top; means for moving each poker into and out of the fuel bed; and means coacting with the said rotating means and with the said pokers for preventing relative rotation of the top and body portion so long as either poker is extended into the fuel bed.

2. A gas producer comprising in combination, a stationary body portion, adapted to contain a fuel bed; a rotatable top therefor; means for rotating said top; a plurality of pokers carried by said top; means for moving each of said pokers into and out of the fuel bed; and means coacting with said rotating means and said pokers for holding the top and body portions stationary relative to each other when either poker is extended into the fuel bed.

3. A gas producer comprising in combination, a body portion, adapted to contain a fuel bed, a top therefor; a pressure operated turning engine for rotating said body portion and top relative to each other, means connecting said engine to a source of supply of pressure fluid; a pressure operated poker carried by said top, means connecting said poker to said source of supply of pressure fluid; a master valve for controlling the supply of pressure fluid to the poker, and an interlock valve cooperating with said poker and said turning engine for controlling operation of said turning engine.

4. A gas producer comprising in combination, a body portion, adapted to contain a fuel bed, a top therefor; a pressure operated turning engine for rotating said body portion and top relative to each other, means connecting said engine to a source of supply of pressure fluid; a pressure operated reciprocable poker carried by said top, means connecting said poker to the said source of supply of pressure fluid; a master valve for controlling the flow of pressure fluid from the said source of supply to the reciprocable poker; and an interlock valve cooperating with the poker and the turning engine, said interlock valve having structural elements whereby operation of the turning engine to cause rotation of the top and body portion relative to each other is prevented so long as the poker is extended into the fuel bed.

5. A gas producer comprising in combination, a body portion, adapted to contain a fuel bed; a rotatable top therefor; a steam operated turning engine carried by said top, a distributing valve for controlling the supply of operating steam to said engine, means coacting with said engine for causing rotation of the said top; a steam operating reciprocating poker mounted upon the said top, means for supplying operating steam to said poker comprising a master valve; fluid pressure means operated by the said engine, for actuating the said master valve, whereby during a predetermined part of the stroke of the turning engine the master valve will be positioned to admit operating steam to the poker to cause reciprocation thereof; and an interlock mechanism coacting with the poker and the distributing valve of the turning engine, whereby the introduction of operating steam to the turning engine to cause reciprocation thereof is prevented so long as the poker is extended into the fuel bed.

6. A gas producer comprising in combination, a body portion, adapted to contain a fuel bed; a rotatable top therefor; a steam operated turning engine carried by said top, a steam operated distributing valve for controlling the flow of operating steam to the cylinder of said engine, a mechanically operated pilot valve for controlling the flow of steam to said distributing valve, to thus control the positioning of that valve and consequently, the flow of steam to the cylinder of the engine; means coacting with said engine for causing the rotation of said top; a steam operated reciprocating poker mounted upon the said top, means for supplying operating steam to said poker, comprising a master valve adapted to control the flow of operating steam through said supplying means to the said poker; means driven by said engine, during the movement of the piston thereof in one direction, for actuating the said master valve to admit operating steam to the said poker to cause downward reciprocation of that poker; and an interlock valve coacting with the poker and with the distributing valve of the said engine, and having structural elements whereby so long as the poker is extended into the fuel bed the admission of pressure steam to move the distributing valve to admit operating steam to the cylinder of the engine to cause reciprocation of the piston thereof in the other direction is prevented.

7. A gas producer comprising in combination, a body portion, adapted to contain a fuel bed; a top therefor, said top and body portion being rotatable relative to each other; a turning engine mounted upon said top, means operated by said engine for rotating the top and body portion relative to each other; a rotatable turret eccentrically positioned within said top, a reciprocable poker mounted upon said turret, means operated by the turning engine for causing rotation of the said turret, whereby upon reciprocation of the piston of the turning engine in one direction the top and body portion of the producer are rotated relative to each other and the poker turret is rotated relative to the top; means for supplying operating steam to said poker to cause reciprocation thereof, means for supplying operating steam to the turning engine to cause operation thereof; and means coacting with the poker and with the turning engine for preventing operation of the engine to cause relative rotation of the top and body portion so long as the poker remains extended into the fuel bed.

8. A gas producer comprising in combination, a body portion adapted to contain a fuel bed; a rotatable top therefor; a turning engine carried by said top, means operated by the turning engine for causing rotation of the said top; a rotatable turret eccentrically positioned within the said top, a reciprocable poker mounted upon said turret; a second reciprocable poker fixedly mounted upon the said top; means for supplying operating steam to the said turning engine; means for supplying operating steam to the said pokers, said means comprising a master valve; and means operated by the said turning engine for actuating the master valve to supply steam to the said pokers during a predetermined part of the stroke of the turning engine, said means having structural elements whereby operating steam is supplied to first one of the pokers and then to the other.

9. A gas producer comprising in combination, a body portion adapted to contain a fuel bed; a rotatable top therefor; means for rotating said top comprising a turning engine; a plurality of reciprocable pokers mounted upon said top; means for causing reciprocation of the said pokers, controlling means therefor; and means coacting with the turning engine and the said controlling means, whereby only one of the pokers will reciprocate at a time; and means coacting with the said pokers and with the turning engine, whereby the turning engine will be held inoperative to rotate the top so long as any one of the pokers is extended into the fuel bed.

10. A gas producer comprising in combination, a stationary body portion, adapted to contain a fuel bed; a rotatable top therefor; a turning engine carried by said top, and adapted to cause rotation thereof; a rotatable turret eccentrically mounted upon said top, means operated by said turning engine for causing rotation of said turret, an inclined poker mounted upon said rotatable turret; a second poker, a mounting for said poker rigidly secured to said top adjacent the periphery thereof; means for causing reciprocation of each of the said pokers; and means, coacting with the said pokers and the said turning engine, adapted to prevent operation of the turning engine so long as either of the pokers is extended into the fuel bed.

11. A gas producer, comprising in combination, a body portion adapted to contain a fuel bed; a rotatable top therefor; a steam driven turning engine mounted upon said top, means for admitting steam to said engine to cause operation thereof, means actuated by said engine for causing rotation of the said top; a steam operated, reciprocable poker mounted upon the said top; a second steam operated reciprocable poker mounted upon said top, adjacent the periphery thereof; means for admitting steam to each of the said pokers; and means coacting with the turning engine, and the said pokers, whereby so long as either poker is extended into the fuel bed the operation of the turning engine will be prevented.

12. A gas producer comprising in combination, a body portion, adapted to contain a fuel bed; a rotatable top therefor; a steam operated turning engine carried by said top, means coacting with said engine for causing rotation of the said top; a steam operated reciprocating poker mounted upon the said top, means for supplying operating steam to said poker, comprising a master valve; means operated by the said turning engine for controlling the said master valve, whereby the poker will be reciprocated during a predetermined part of the stroke of the turning engine.

13. A gas producer comprising in combination, a stationary body portion, adapted to contain a fuel bed; a rotatable top therefor; means for rotating said top; a plurality of pokers carried by said top, means for positively reciprocating the pokers to cause these pokers to move into and out of the fuel bed, said means having structural elements whereby only one of the pokers is reciprocated at a time.

14. A gas producer comprising in combination, a body portion adapted to contain a fuel bed; a top therefor; means for rotating the said top; a reciprocating poker eccentrically mounted upon the top and positioned to agitate the main portion of the fuel bed; a second reciprocating poker also mounted upon the top and positioned to agitate the zone of fuel adjacent the wall of the body portion of the producer; and means for causing positive reciprocation of the two said pokers, to cause each of the pokers to move into and out of the fuel bed, said means having structural elements whereby first one poker and then the other will be caused to reciprocate, but both pokers will not be caused to reciprocate at the same time.

15. A gas producer comprising in combination, a body portion, adapted to contain a fuel bed, a top therefor; means for rotating said body portion and top relative to each other; a plurality of pressure operated pokers carried by said top, means for supplying pressure fluid to operate upon said pokers to cause reciprocation of each poker in opposite directions to move the pokers into and out of the fuel bed, said means having structural elements whereby only one of the pokers is reciprocated at a time.

16. A gas producer comprising in combination, a body portion adapted to contain a fuel bed, a top therefor; means for rotating the said body portion and top relative to each other; a steam operated poker mounted upon the said top adjacent the outer edge thereof, means for introducing pressure steam to said poker to cause reciprocation thereof, a mounting for said poker rigidly secured to the said top and so positioned that as the top and body portion are moved relative to each other said poker will agitate the outer zone of fuel in the said fuel bed; a second steam operated poker carried by the said top, means for supplying pressure steam to said poker to cause reciprocation thereof, said second poker being so mounted upon the said top that its positioning may be varied so that during rotation of the said body portion and top relative to each other said poker will be caused to agitate the main portion of the fuel bed; and a master valve for controlling the supply of pressure steam to the said pokers, having structural elements whereby steam is supplied to only one poker at a time.

17. A gas producer comprising in combination, a body portion, adapted to contain a fuel bed, a top therefor; a turning engine carried by said top, means operated by the turning engine for causing rotation of the said body portion and top relative to each other; a plurality of steam operated reciprocating pokers carried by the said top; means for supplying operating steam to the said engine; means for supplying operating steam to the said pokers, said means comprising a master valve having a plurality of valve members therein, there being one of said valve members for each poker; and means operated by the said turning engine for actuating the valve members of the said master valve to supply steam to the said pokers during a predetermined part of the stroke of the turning engine, said means having structural elements whereby each valve member is actuated in turn to admit steam to its cooperating poker, while the other valve members are inoperative, and the pokers are actuated one at a time in regular sequence.

18. A gas producer comprising in combination, a body portion adapted to contain a fuel bed, a top therefor; a turning engine carried by said top, means operated by the turning engine for causing rotation of the said body portion and top relative to each other; a plurality of steam operated reciprocating pokers carried by said top; means for supplying operating steam to the said pokers, said means comprising a master valve having a plurality of valve members therein, there being one valve member for each poker; and means operated by the said turning engine for actuating the said valve members to supply operating steam to the pokers during a predetermined part of the cycle of operation of the turning engine, said means comprising a cylinder, a reciprocating piston therein, a plurality of passages connecting the opposite ends of the said cylinder to the master valve, there being one passage from each end of the said cylinder for each valve member, said cylinder and cooperating passages being adapted to contain a fluid therein, and valve mechanism controlling the said passages, having structural elements whereby upon one reciprocation of the piston in one direction the said valve mechanism is actuated to cause the flow of pressure fluid through one of the said passages to actuate the valve member cooperating therewith to admit pressure steam to the poker cooperating with that said valve member, while the flow of pressure fluid through the other passage to actuate the other of the said valve members is prevented.

19. A gas producer comprising in combination, a body portion, adapted to contain a fuel bed, a top therefor; a turning engine carried by said top, means operated by the turning engine for causing rotation of the said body portion and top relative to each other; a plurality of steam operated reciprocating pokers carried by said top; means for supplying operating steam to the said pokers, said means comprising a master valve having a plurality of valve members therein, there being one valve member for each poker; and means operated by the said turning engine for actuating the said valve members to supply operating steam to the pokers during a predetermined part of the cycle of operation of the turning engine, said means comprising a cylinder, a reciprocating piston therein, a plurality of passages connecting the opposite ends of the said cylinder to the master valve, there being one passage from each end of the said cylinder for each valve member, said cylinder and cooperating passages being adapted to contain a fluid therein, and valve mechanism controlling the said passages having structural elements whereby upon successive reciprocations of the piston in one direction the said valve mechanism is actuated to cause the flow of pressure fluid through each of the said passages in turn to actuate, in regular turn, each of the valve members, within the master valve, cooperating with the said passages, to thus, in regular sequence, admit pressure steam to the said pokers, to cause reciprocation, in regular sequence, of each of the said pokers, while the other poker is held inoperative.

20. A gas producer comprising in combination, a body portion, adapted to contain a fuel bed, a top therefor; means for rotating the said body portion and top relative to each other; a pressure operated poker mechanism mounted upon the said top, in fixed position, adjacent the periphery thereof, a reciprocable poker within said poker mechanism adapted to agitate the zone of fuel near the wall of the body portion of the producer; and a second pressure operated poker mechanism having a reciprocable poker therein carried by the top and so mounted that its positioning may be varied relative to said top to agitate the main portion of the fuel bed.

In testimony whereof I hereto affix my signature.

HARRY F. SMITH.